US012674713B2

(12) United States Patent
Yukawa

(10) Patent No.: US 12,674,713 B2
(45) Date of Patent: Jul. 7, 2026

(54) LOAD ESTIMATING DEVICE FOR ROLLING BEARING, CONTROL DEVICE FOR MECHANICAL DEVICE PROVIDED WITH ROLLING BEARING, LOAD ESTIMATING METHOD, AND PROGRAM

(71) Applicant: NSK Ltd., Tokyo (JP)

(72) Inventor: Kinji Yukawa, Kanagawa (JP)

(73) Assignee: NSK LTD., Tokyo (JP)

( * ) Notice: Subject to any disclaimer, the term of this patent is extended or adjusted under 35 U.S.C. 154(b) by 425 days.

(21) Appl. No.: 18/282,389

(22) PCT Filed: Jun. 8, 2022

(86) PCT No.: PCT/JP2022/023202
§ 371 (c)(1),
(2) Date: Sep. 15, 2023

(87) PCT Pub. No.: WO2022/264905
PCT Pub. Date: Dec. 22, 2022

(65) Prior Publication Data
US 2024/0035906 A1 Feb. 1, 2024

(30) Foreign Application Priority Data

Jun. 16, 2021 (JP) ................................ 2021-100416
Sep. 3, 2021 (JP) ................................ 2021-143992

(51) Int. Cl.
*G01L 5/00* (2006.01)
*F03D 7/02* (2006.01)
*F03D 80/70* (2016.01)

(52) U.S. Cl.
CPC .......... *G01L 5/0009* (2013.01); *F03D 7/0224* (2013.01); *F03D 7/0244* (2013.01);
(Continued)

(58) Field of Classification Search
CPC .... G01L 5/0009; F03D 17/006; F03D 17/011; F03D 17/032; F03D 80/703;
(Continued)

(56) References Cited

U.S. PATENT DOCUMENTS 10,519,935 B2 * 12/2019 Sakaguchi .............. F03D 17/00
10,697,854 B2 * 6/2020 Yamashita ............ G01M 13/04
(Continued)

FOREIGN PATENT DOCUMENTS

CN 1717575 A 1/2006
CN 205876607 U 1/2017
(Continued)

OTHER PUBLICATIONS

International Search Report (PCT/ISA/210) issued on Sep. 6, 2022 by the International Searching Authority in International Patent Application No. PCT/JP2022/023202.
(Continued)

*Primary Examiner* — Ricky Go
(74) *Attorney, Agent, or Firm* — Sughrue Mion, PLLC

(57) ABSTRACT

This load estimating device for a rolling bearing comprises: a vibration sensor for measuring vibrations of the rolling bearing during rotation; a rotational speed sensor for measuring the rotational speed of the rolling bearing during rotation; a deriving means for deriving a vibration value for a predetermined vibration frequency, using vibration information measured by the vibration sensor; and an estimating means for estimating a load acting on the rolling bearing, said load corresponding to the rotational speed measured by the rotational speed sensor and the vibration value derived by the deriving means, using a table defining a correspondence relationship between the load acting on the rolling bearing, the vibration value for the predetermined vibration frequency, and the rotational speed.

15 Claims, 12 Drawing Sheets

(52) U.S. Cl.
CPC .......... *F03D 80/70* (2016.05); *F05B 2240/50* (2013.01); *F05B 2260/70* (2013.01); *F05B 2260/90* (2013.01)

(58) Field of Classification Search
CPC ... F16C 2360/31; F16C 19/522; G01H 17/00; G01M 13/04; G01M 13/045
See application file for complete search history.

(56) References Cited

U.S. PATENT DOCUMENTS

| | | | |
|---|---|---|---|
| 2006/0042406 A1 | 3/2006 | Ono | |
| 2006/0167659 A1 | 7/2006 | Miyasaka et al. | |
| 2014/0367967 A1 | 12/2014 | Ossyra | |
| 2018/0187651 A1* | 7/2018 | Frydendal | F03D 7/0292 |
| 2019/0331542 A1 | 10/2019 | Bormann et al. | |
| 2022/0213872 A1* | 7/2022 | Iwanaga | G05B 23/0283 |
| 2022/0228569 A1* | 7/2022 | Pedersen | F03D 17/00 |
| 2022/0252050 A1* | 8/2022 | Herp | F03D 17/00 |
| 2022/0365137 A1* | 11/2022 | Manson | G01R 31/346 |

FOREIGN PATENT DOCUMENTS

| | | |
|---|---|---|
| CN | 110411749 A | 11/2019 |
| CN | 111783274 A | 10/2020 |
| CN | 112284575 A | 1/2021 |
| JP | 11-2239 A | 1/1999 |
| JP | 2005-283323 A | 10/2005 |
| JP | 2006-300086 A | 11/2006 |
| JP | 2008-134115 A | 6/2008 |
| JP | 2010-159710 A | 7/2010 |
| JP | 5534875 B2 | 7/2014 |
| JP | 2018-179735 A | 11/2018 |
| JP | 2019-132773 A | 8/2019 |
| WO | 2019/012788 A1 | 1/2019 |

OTHER PUBLICATIONS

Written Opinion (PCT/ISA/237) issued on Sep. 6, 2022 by the International Searching Authority in International Patent Application No. PCT/JP2022/023202.
Communication dated Mar. 24, 2026, issued by the China National Intellectual Property Administration in Chinese Application No. 202280022996.9.

* cited by examiner

*FIG. 2*

SIGNAL INTENSITY

TIME

SIGNAL INTENSITY

TIME

*FIG. 7*

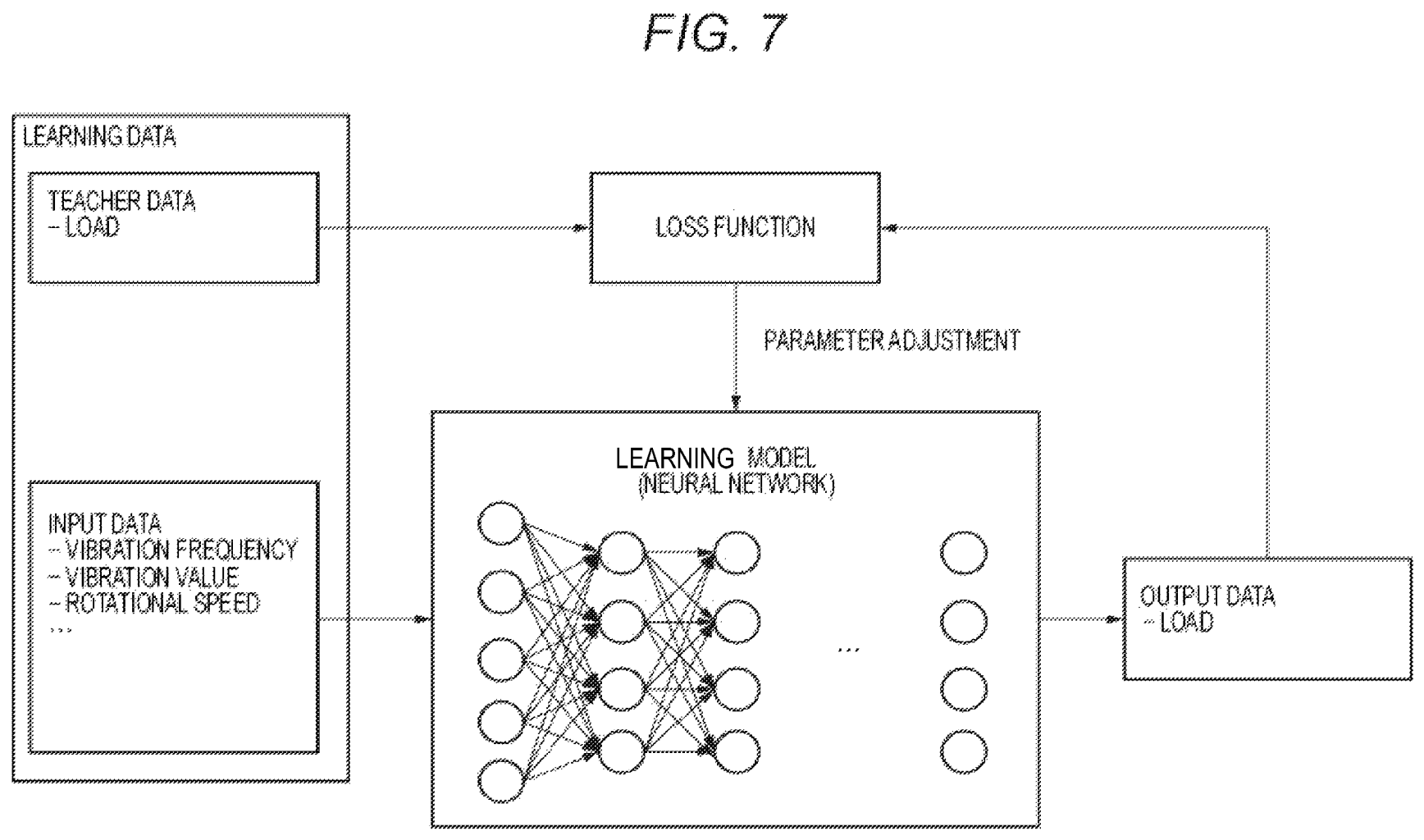

LEARNING DATA

TEACHER DATA
- LOAD

INPUT DATA
- VIBRATION FREQUENCY
- VIBRATION VALUE
- ROTATIONAL SPEED
- ...

LOSS FUNCTION

PARAMETER ADJUSTMENT

LEARNING MODEL
(NEURAL NETWORK)

OUTPUT DATA
- LOAD

*FIG. 9*

| ROTATIONAL FREQUENCY | VIBRATION VALUE | LOAD |
|---|---|---|
| ×××× | ○ ○ ○ | × × △ |
| | ◆ ◆ ◆ | △ △ ◇ |
| | □ □ □ | ◆ ◆ △ |
| | ○ × △ | ○ ○ ○ |
| | ◇ △ × | ◆ ◆ ◆ |
| × ○ △ | ○ ○ ○ | □ □ □ |
| | ◆ ◆ ◆ | ○ × △ |
| | □ □ □ | ◇ △ × |
| | ○ × △ | ○ ○ ○ |
| | ◇ △ × | ◆ ◆ ◆ |
| △ ● ◇ | ○ ○ ○ | □ □ □ |
| | ◆ ◆ ◆ | ○ × △ |
| | □ □ □ | ○ ○ ○ |
| | ○ × △ | ◆ ◆ ◆ |
| | ◇ △ × | □ □ □ |

LOAD ESTIMATING DEVICE FOR ROLLING BEARING, CONTROL DEVICE FOR MECHANICAL DEVICE PROVIDED WITH ROLLING BEARING, LOAD ESTIMATING METHOD, AND PROGRAM

CROSS REFERENCE TO RELATED APPLICATIONS

This application is a National Stage of International Application No. PCT/JP2022/023202 filed on Jun. 8, 2022, claiming priority from Japanese Patent Application No. 2021-100416 filed on Jun. 16, 2021 and Japanese Patent Application No. 2021-143992 filed on Sep. 3, 2021, the disclosures of which are incorporated herein in their entirety by reference.

TECHNICAL FIELD

The present invention relates to a load estimating device for a rolling bearing, a control device for a mechanical device provided with a rolling bearing, a load estimating method, and a program.

BACKGROUND ART

In the related art, a mechanical device such as a wind turbine is required to perform control in accordance with a load applied to a rotary component such as a rolling bearing provided inside the mechanical device. For example, in a rolling bearing, in a case in which the load becomes too small, rotation sliding or revolution sliding occurs, and smearing occurs. On the other hand, in a case in which the load is too large, there is a possibility that a failure such as hollowing at an early stage or abnormal heat generation may occur. Such a failure may cause a malfunction of the device or shortening of the service life. Therefore, a method for measuring a load applied to the rolling bearing is required in order to suppress a failure. For example, in a wind turbine generator, an instantaneous change in wind direction or wind volume occurs, and a rotational speed or the load of the rolling bearing also changes in accordance with the change. Such a change in the load resulting from a rapid change in the rotational speed adversely affects the service life of the rolling bearing included in the wind turbine generator. Therefore, a method for monitoring a state of the rolling bearing and performing feedback control in accordance with a situation has been proposed. For example, it is necessary to perform control on the rotational speed or the like in accordance with an instantaneous change in wind direction or wind volume in a wind turbine generator. However, the load can be calculated in a case in which the wind turbine generator rotates in a stable state. On the other hand, since it is difficult to calculate the load in a case in which the rotational frequency instantaneously varies and the wind turbine generator rotates, it is required to actually measure the load, but it is difficult to measure the load during a rotation operation under an environment in which the rotational speed may vary instantaneously under the influence of wind.

For example, Patent Literature 1 discloses a method for measuring a load based on a relative displacement between an outer ring and an inner ring in a main shaft bearing of a wind turbine generator. Patent Literature 2 discloses a method for measuring vibration generated during a rotation operation of a rolling bearing and calculating a load based on a frequency obtained from the measured vibration.

CITATION LIST

Patent Literature

Patent Literature 1: JP2010-159710A
Patent Literature 2: JPH11-002239A

SUMMARY OF INVENTION

Technical Problem

However, the attachment may be difficult and the cost may be high in a method using a strain gauge or a displacement sensor as in the technique of Patent Literature 1, and it may be difficult to perform measurement with high accuracy in a method using a vibration sensor or an ultrasonic sensor. The technique of Patent Literature 2 may be not sufficient for applications in which the rotational speed changes. Further, load estimation based on a contact angle as in Patent Literature 2 can be applied only to a bearing in which the contact angle changes due to a contact load, and an error is large except in a case in which the load is close to a pure axial load. That is, in the method in the related art, the load may be calculated in a case in which the rolling bearing rotates in a stable state. However, it is difficult to measure the load during the rotation operation under an environment in which the rotational speed may vary instantaneously due to an external factor such as wind.

In view of the above problems, an object of the present invention is to provide elongation of the service life of a device provided with a rolling bearing and suppression of a failure in response to a change in rotational speed resulting from an instantaneous change in wind during a rotation operation.

Solution to Problem

In order to solve the above problems, the present invention has the following configuration. That is, a load estimating device for a rolling bearing, includes:
    a vibration sensor configured to measure vibration of the rolling bearing during rotation;
    a rotational speed sensor configured to measure a rotational speed of the rolling bearing during rotation;
    a derivation portion configured to derive a vibration value of a predetermined vibration frequency using vibration information measured by the vibration sensor; and
    an estimation portion configured to estimate a load applied to the rolling bearing, the load corresponding to the rotational speed measured by the rotational speed sensor and the vibration value derived by the derivation portion, using a table in which a correspondence relationship among the load applied to the rolling bearing, the vibration value of the predetermined vibration frequency, and the rotational speed is defined.
    Another aspect of the present invention has the following configuration. That is, a load estimating device for a rolling bearing, includes:
    a vibration sensor configured to measure vibration of the rolling bearing during rotation;
    a rotational speed sensor configured to measure a rotational speed of the rolling bearing during rotation;

a derivation portion configured to derive a vibration value of a predetermined vibration frequency using vibration information measured by the vibration sensor; and an estimation portion configured to estimate a load applied to the rolling bearing, the load corresponding to the vibration value of the predetermined vibration frequency derived by the derivation portion and the rotational speed measured by the rotational speed sensor, using a learned model obtained by performing learning processing using data including a pair of the load applied to the rolling bearing as well as the vibration value of the predetermined vibration frequency and the rotational speed of the rolling bearing as learning data and using the load applied to the rolling bearing as output data.

Another aspect of the present invention has the following configuration. That is, a control device for a mechanical device including a rolling bearing, the control device includes:

a load estimating device; and a controller, in which the load estimating device includes:

a vibration sensor configured to measure vibration of the rolling bearing during rotation;

a rotational speed sensor configured to measure a rotational speed of the rolling bearing during rotation;

a derivation portion configured to derive a vibration value of a predetermined vibration frequency using vibration information measured by the vibration sensor; and an estimation portion configured to estimate a load applied to the rolling bearing, the load corresponding to the vibration value of the predetermined vibration frequency derived by the derivation portion and the rotational speed measured by the rotational speed sensor, using a learned model obtained by performing learning processing using data including a pair of the load applied to the rolling bearing as well as the vibration value of the predetermined vibration frequency and the rotational speed of the rolling bearing as learning data and using the load applied to the rolling bearing as output data, and the controller is configured to control at least one of torque around a shaft supported by the rolling bearing and rotation of the rolling bearing in accordance with the load estimated by the estimation portion.

Another aspect of the present invention has the following configuration. That is, a load estimating method for a rolling bearing, includes:

a first measurement step of measuring vibration of the rolling bearing during rotation;

a second measurement step of measuring a rotational speed of the rolling bearing during rotation;

a derivation step of deriving a vibration value of a predetermined vibration frequency using vibration information measured in the first measurement step; and an estimation step of estimating a load applied to the rolling bearing, the load corresponding to the rotational speed measured in the second measurement step and the vibration value derived in the derivation step, using a table in which a correspondence relationship among the load applied to the rolling bearing, the vibration value of the predetermined vibration frequency, and the rotational speed is defined.

Another aspect of the present invention has the following configuration. That is, a load estimating method for a rolling bearing, includes:

a first measurement step of measuring vibration of the rolling bearing during rotation;

a second measurement step of measuring a rotational speed of the rolling bearing during rotation;

a derivation step of deriving a vibration value of a predetermined vibration frequency using vibration information measured in the first measurement step; and an estimation step of estimating a load applied to the rolling bearing, the load corresponding to the vibration value of the predetermined vibration frequency derived in the derivation step and the rotational speed measured in the second measurement step, using a learned model obtained by performing learning processing using data including a pair of the load applied to the rolling bearing as well as the vibration value of the predetermined vibration frequency and the rotational speed of the rolling bearing as learning data and using the load applied to the rolling bearing as output data.

Another aspect of the present invention has the following configuration. That is, a non-transitory computer-readable storage medium storing a computer program is configured to cause a computer to function as:

a first acquisition portion configured to acquire vibration information of a rolling bearing during rotation;

a second acquisition portion configured to acquire a rotational speed of the rolling bearing during rotation;

a derivation portion configured to derive a vibration value of a predetermined vibration frequency using the vibration information; and an estimation portion configured to estimate a load applied to the rolling bearing, the load corresponding to the rotational speed acquired by the second acquisition portion and the vibration value derived by the derivation portion, using a table in which a correspondence relationship among the load applied to the rolling bearing, the vibration value of the predetermined vibration frequency, and the rotational speed is defined.

Another aspect of the present invention has the following configuration. That is, a non-transitory computer-readable storage medium storing a computer program is configured to cause a computer to function as:

a first acquisition portion configured to acquire vibration information of a rolling bearing during rotation;

a second acquisition portion configured to acquire information on a rotational speed of the rolling bearing during rotation;

a derivation portion configured to derive a vibration value of a predetermined vibration frequency using the vibration information; and an estimation portion configured to estimate a load applied to the rolling bearing, the load corresponding to the vibration value of the predetermined vibration frequency derived by the derivation portion and the rotational speed acquired by the second acquisition portion, using a learned model obtained by performing learning processing using data including a pair of the load applied to the rolling bearing as well as the vibration value of the predetermined vibration frequency and the rotational speed of the rolling bearing as learning data and using the load applied to the rolling bearing as output data.

Advantageous Effects of Invention

According to the present invention, it is possible to elongate the service life of a device provided with a rolling bearing and to suppress a failure in response to a change in rotational speed resulting from an instantaneous change in wind during a rotation operation.

BRIEF DESCRIPTION OF DRAWINGS

FIG. 2 is a conceptual diagram for explaining a functional configuration and measurement according to the first embodiment.

FIG. 7 is a schematic diagram for explaining learning processing according to the second embodiment.

FIG. 9 is a diagram showing an example of a table representing a correspondence relationship between a vibration value of a predetermined vibration frequency and a load at each rotational speed.

DESCRIPTION OF EMBODIMENTS

Figure 1:
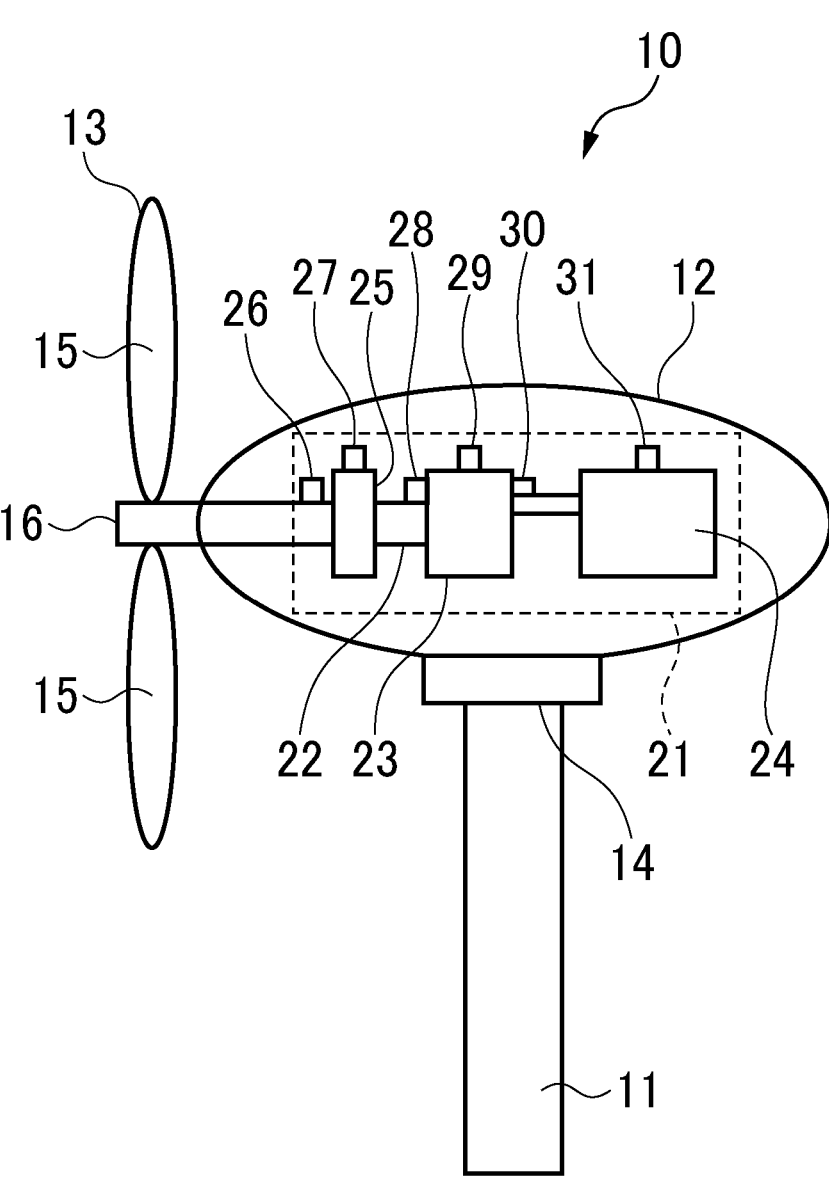
FIG. 1 is a schematic diagram showing an example of a device configuration according to a first embodiment.

Hereinafter, embodiments of the present invention will be described with reference to the drawings. The embodiments described below are embodiments for explaining the present invention, and are not intended to be interpreted to limit the present invention, and all the configurations described in the embodiments are not necessarily essential configurations for solving the problem of the present invention. In the drawings, the same components are denoted by the same reference numerals, thereby showing a correspondence relationship therebetween.

First Embodiment

Hereinafter, a first embodiment of the present invention will be described.

[Device Configuration]

Hereinafter, an embodiment of a device to which a load estimating method according to the present invention may be applied will be described. In the following description, for example, a wind turbine generator including a rolling bearing will be described as an example of an object to be measured, but without being limited to a wind turbine generator, it is also possible to similarly estimate a load on a rolling bearing in a case of other mechanical devices.

FIG. 1 is a schematic configuration diagram of a wind turbine generator to which a load estimating method according to the present embodiment is applied. As shown in FIG. 1, a wind turbine generator 10 includes a tower 11 standing on the ground or on the sea, a nacelle 12 supported on an upper end of the tower 11, and a rotor 13 provided on an end portion of the nacelle 12. A rotation mechanism 14 for adjusting an orientation of the nacelle 12 (yaw control) is provided between the tower 11 and the nacelle 12.

A drive train portion 21 is accommodated in the nacelle 12. The drive train portion 21 includes a main shaft 22, a speed increaser 23, a power generator 24, and a bearing unit 25. The main shaft 22 is connected to the power generator 24 via the speed increaser 23. The main shaft 22 is rotatably supported in the nacelle 12 by the bearing unit 25. The bearing unit that supports the main shaft 22 is provided with a vibration sensor 27 to measure vibration generated in the bearing unit 25. A rotational speed sensor 26 that detects a rotational speed of the main shaft 22 is disposed. A power generation amount measurement device 31 that measures a power generation amount is disposed at the power generator 24.

The rotor 13 includes a hub 16 and a plurality of blades 15. The blades 15 extend radially from the hub 16. The rotor 13 is provided at an end portion of the main shaft 22 of the drive train portion 21. The hub 16 adjusts an orientation of each of the plurality of blades 15 (pitch control) by controlling rotation around a rotary shaft (not shown) corresponding to each of the plurality of blades 15.

Figure 2:
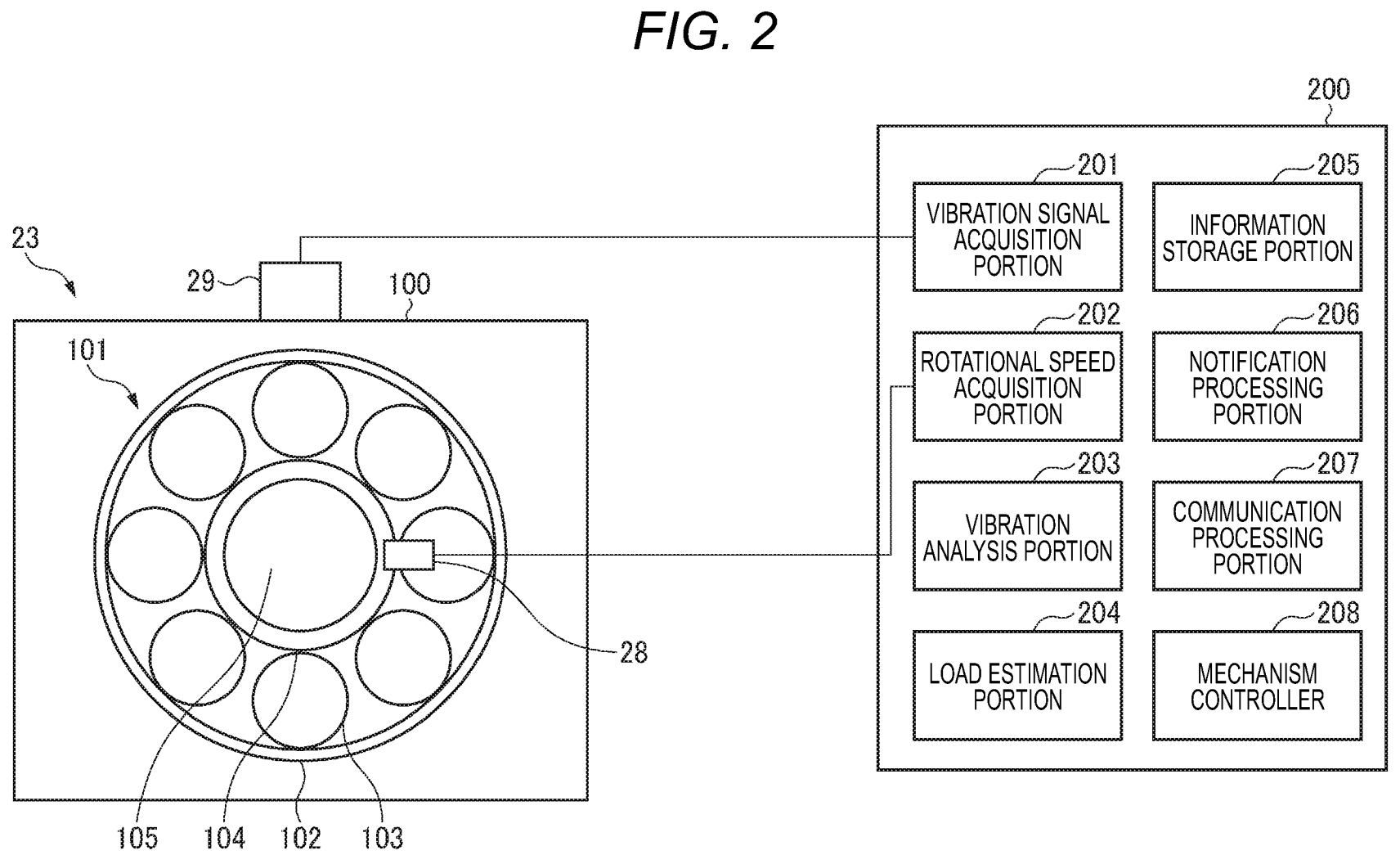

In the wind turbine generator 10, the rotary shafts of the speed increaser 23 and the power generator 24 are also supported by a rolling bearing. Rotational speed sensors 28 and are provided on a rotor 13 side and a power generator 24 side of the speed increaser 23, respectively. The rotational speed sensor 28 detects a rotational speed of a rotary shaft on the rotor 13 side (that is, an input side of the speed increaser 23). The rotational speed sensor 30 detects a rotational speed of a rotary shaft on the power generator 24 side (that is, an output side of the speed increaser 23). Since the speed increaser 23 accelerates the rotation of the main shaft 22 via a gear (not shown) or the like, the rotational speeds of the rotary shafts on the input side and the output side vary. A vibration sensor 29 is provided at the speed increaser 23 to measure vibration generated in the speed increaser 23. The drive train portion 21 is provided with a brake device (not shown) for stopping or decelerating the rotation of the main shaft 22 as necessary. The rotational speed sensor 26 provided for the bearing unit 25 and the rotational speed sensors 28 and 30 provided for the speed increaser 23 may have the same configuration or different configurations. Since torque is transmitted between the main shaft 22 and the rotary shaft on the output side of the speed increaser 23 by a plurality of rotary shafts and gears, a delay occurs. Therefore, as shown in FIG. 2, the rotational speed sensor 28 is attached to the input side and the output side of the speed increaser 23 for accuracy, but the rotational speed sensor 28 may be attached to the input side or the output side of the speed increaser 23 according to the configuration. The vibration sensor 27 provided for the bearing unit 25 and the vibration sensor 29 provided for the speed increaser 23 may have the same configuration or different configurations.

In the wind turbine generator 10 having the above-described structure, the main shaft 22 is rotated by the blades 15 of the rotor 13 receiving wind. Thus, the rotation of the main shaft 22 is accelerated by the speed increaser 23 and transmitted to the power generator 24, and power is generated by the power generator 24. The blades 15 of the rotor 13 receive wind, thereby applying loads (radial load and axial load) to the bearing unit 25 and the speed increaser 23 via the main shaft 22. FIG. 1 shows a configuration in which one bearing unit 25 is provided for one wind turbine generator 10 for simplification of description, but without being limited to this configuration, a plurality of bearing units 25 may be provided for one wind turbine generator 10.
[Functional Configuration]

FIG. 2 is a conceptual diagram for explaining a functional configuration and measurement according to the present embodiment. FIG. 2 shows configurations of the speed increaser 23 to which load estimation by a load estimating method according to the present embodiment is applied and a load estimating device 200 that performs the load estimation. A rolling bearing 101 that supports a rotary shaft 105 that transmits the rotation of the main shaft 22 is provided in the speed increaser 23. In the present embodiment, as the rolling bearing 101, for example, a tapered roller bearing or a cylindrical roller bearing may be used, but is not limited thereto. FIG. 2 shows an example in which one rolling bearing 101 is provided in the speed increaser 23 for simplification of description. However, without being limited to this configuration, a plurality of rolling bearings 101 may be provided in one speed increaser 23. Components for transmitting and accelerating the rotation are further included in the speed increaser 23, but the description thereof is omitted here. Although in FIG. 2, the speed increaser 23 is described as an example of a target to which the load estimating method according to the present embodiment is applied, the load estimating method may be applied to the bearing unit 25 or the power generator 24.

The load estimating device 200 may be provided in the wind turbine generator 10 shown in FIG. 1 or may be provided outside the wind turbine generator 10. A configuration in which one load estimating device 200 is provided for one speed increaser 23 is shown in FIG. 2 for simplification of description. However, without being limited to this configuration, one load estimating device 200 may perform load estimation on a plurality of wind turbine generators 10 (that is, a plurality of speed increasers 23, a plurality of bearing units 25, and a plurality of power generators 24).

The rolling bearing 101 rotatably supports the rotary shaft 105. The rotary shaft 105 is supported by a housing 100 that covers the outside of the speed increaser 23 or a planet carrier (not shown) via the rolling bearing 101 which is a rotary component. The rolling bearing 101 includes an inner ring 104 which is a rotating ring externally fitted to the rotary shaft 105 or a fixed ring externally fitted to a planetary shaft (not shown), an outer ring 102 which is a fixed ring internally fitted to the housing 100 or a rotating ring internally fitted to a planetary wheel (not shown), a plurality of rollers (balls) which are a plurality of rolling elements 103 disposed between the inner ring 104 and the outer ring 102, and a cage (not shown) that holds the rolling elements 103 in a freely rolling manner. In the rolling bearing 101, friction between the inner ring 104 and the rolling element 103 as well as friction between the outer ring 102 and the rolling element 103 are reduced by a predetermined lubrication method. The lubrication method is not particularly limited, and for example, grease lubrication or oil lubrication is used. A type of a lubricant is not particularly limited.

The speed increaser 23 includes the vibration sensor 29 that detects vibration generated from the rolling bearing 101 during rotation of the rotary shaft 105. The vibration sensor 29 is fixed to the vicinity of the outer ring of the housing 100 by bolt fixation, adhesion, bolt fixation and adhesion, embedding with a molding material, or the like. In a case of the bolt fixation, a turning suppression function may be provided. The vibration sensor 29 is not limited to a configuration of being fixed and provided at a detection position, and may be provided at a position for detecting vibration by the rolling bearing 101 at the time of load estimation. Therefore, the vibration sensor 29 may be configured to be detachable or movable.

The vibration sensor 29 may be any sensor capable of detecting vibration, and may be any sensor capable of converting the detected vibration such as an acceleration, speed, strain, stress, or displacement-type to an electric signal, such as an acceleration sensor, an acoustic emission (AE) sensor, an ultrasonic sensor, a shock pulse sensor. At the time of being attached to the wind turbine generator 10 located in an environment where there is a large amount of noise, it is more preferable to use an insulated-type sensor because the insulated-type sensor is less affected by the noise. Further, in a case in which the vibration sensor 29 uses a vibration detection element such as a piezoelectric element, the element may be configured by being molded in plastic or the like.

Further, the speed increaser 23 is provided with the rotational speed sensor 28 that detects a rotational speed of the inner ring 104 externally fitted to the rotary shaft 105. Here, the rotational speed sensor 28 disposed on the rotor 13 side will be described as an example. In the present embodiment, the rotational speeds and the rotational frequencies of the rotary shaft 105 and the inner ring 104 which is a rotary ring are the same. The torque and the rotational speed of the rotary shaft 105 to which the rotation is transmitted from the main shaft 22 may vary depending on the direction, the volume, and the pressure of the wind received by the wind turbine generator 10, the pitch angle and the yaw angle of the blades 15, and the output of the power generator 24. Further, the rotational speed may be adjusted by the brake device (not shown). The rotational speed sensor 28 may detect the rotational speed of the rolling bearing 101 by detecting an encoder (not shown) provided at the inner ring 104 of the rolling bearing 101, for example. The vibration sensor 29 and the rotational speed sensor 28 may be configured to perform a detection operation only at a designated timing (for example, at the time of load estimation) based on an instruction or the like of a user of the load estimating device 200 (for example, an administrator of the wind turbine generator 10), or may be configured to constantly perform the detection operation.

The load estimating device 200 may be implemented by, for example, an information processing device including a control device, a storage device, and an input/output device which are not shown. The control device may include a central processing unit (CPU), a micro processing unit (MPU), a digital single processor (DSP), and a dedicated circuit. The storage device includes volatile and nonvolatile storage media such as a hard disk drive (HDD), a read only memory (ROM), and a random access memory (RAM), and may input and output various kinds of information in response to an instruction from the control device. The output device includes a display device such as a liquid crystal display, or a speaker or a light, and performs notification to an operator in response to the instruction from the control device. A notification method by the output device is not particularly limited, but may be, for example, visual notification by screen output or auditory notification by voice, and various kinds of input and output operations may be performed by transmitting data to and receiving data from an external device (not shown) via a network (not shown).

The load estimating device 200 includes a vibration signal acquisition portion 201, a rotational speed acquisition portion 202, a vibration analysis portion 203, a load estimation portion 204, an information storage portion 205, a notification processing portion 206, a communication processing portion 207, and a mechanism controller 208. Each portion may be implemented by the above-described control device reading a corresponding program from the storage device and executing the program. Further, various kinds of operations such as a notification operation and a communication operation may be performed by the control device controlling the input/output device.

The vibration signal acquisition portion 201 acquires an electric signal detected by the vibration sensor 29 as vibration information. The vibration signal acquisition portion 201 may perform analog/digital (A/D) conversion by an AD converter (not shown) or a signal amplification process by an amplifier (not shown) in accordance with a content of the electric signal. The acquired vibration information is output to the information storage portion 205.

The rotational speed acquisition portion 202 acquires the rotational speed of the rotary shaft 105 (or the inner ring 104) detected by the rotational speed sensor 28. Information on the acquired rotational speed is output to the information storage portion 205.

The vibration analysis portion 203 can apply envelope processing, predetermined filter processing, or the like to the vibration information stored in the information storage portion 205. A frequency band corresponding to a theoretical frequency of the rolling bearing 101 is extracted in the vibration information indicated by the electric signal acquired by the vibration sensor 29. Contents of data processing or the filter processing here are not particularly limited, and processing using a low pass filter (LPF) that removes a predetermined high-frequency component from the vibration information or a high pass filter (HPF) that removes a predetermined low-frequency component may be performed. Alternatively, processing using a band pass filter (BPF) that extracts a predetermined frequency component may be performed. The vibration analysis portion 203 performs frequency analysis of the vibration indicated by the vibration information using the vibration information to which the filter processing is applied. More specifically, the vibration analysis portion 203 derives a vibration value (acceleration, speed, displacement) corresponding to the theoretical frequency of the rolling bearing 101. Regarding the vibration value, it is not necessary to derive all of the acceleration, the speed, and the displacement, and any one of them may be derived.

The load estimation portion 204 estimates the load applied to the rolling bearing 101 based on the vibration value derived by the vibration analysis portion 203. Details of the estimation method according to the present embodiment will be described later.

The information storage portion 205 receives, as appropriate, and stores vibration information and rotational speed information output from the vibration signal acquisition portion 201 and the rotational speed acquisition portion 202. At this time, the detection timings of the vibration sensor 29 and the rotational speed sensor 28 correspond to each other, and the detection information is stored in association with each other. In addition, the information storage portion 205 provides various kinds of information stored therein to other parts such as the vibration analysis portion 203 as appropriate. The information storage portion 205 may store an analysis result of the vibration analysis portion 203 or an estimation result of the load estimation portion 204 as history information. The notification processing portion 206 performs notification processing based on the estimation result by the load estimation portion 204. The communication processing portion 207 controls communication with the outside via a network (not shown). For example, the communication processing portion 207 transmits the estimation result by the load estimation portion 204 to an external device (not shown).

The mechanism controller 208 controls the operation of the wind turbine generator based on the estimation result by the load estimation portion 204. Specifically, the rotation mechanism 14 may be controlled to adjust the orientation of the nacelle 12 (yaw control), the hub 16 may be controlled to adjust the orientation of each of the plurality of blades 15 (pitch control), or the output of the power generator 24 may be controlled. In addition, the rotational speed or the rotational acceleration of the main shaft 22 may be controlled to be a predetermined value by a brake mechanism (not shown).

[Detection Data]

Figure 3A:
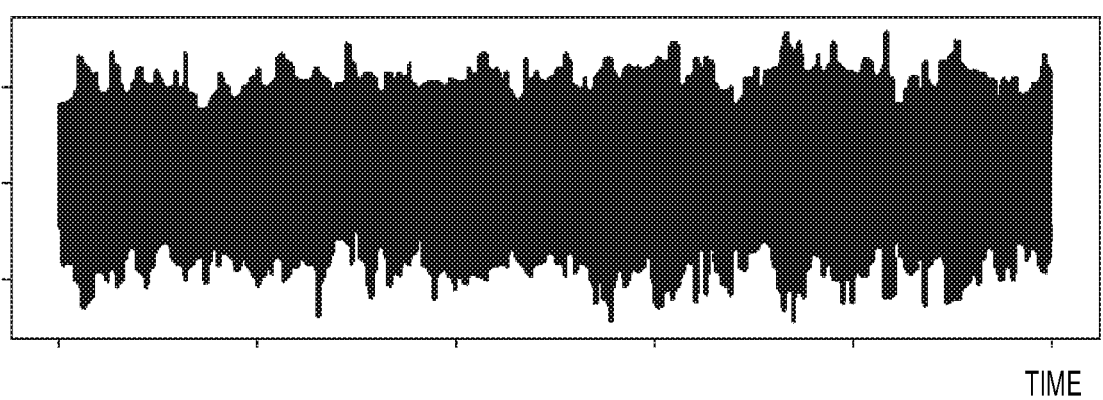
FIG. 3A is a diagram showing an example of data detected by various kinds of sensors.
Figure 3B:
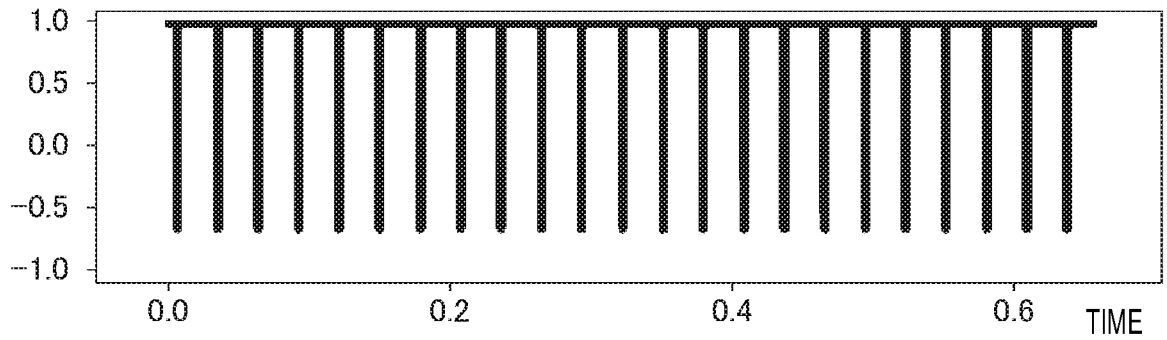
FIG. 3B is a diagram showing an example of data detected by various kinds of sensors.

FIGS. 3A and 3B are diagrams showing an example of data detected by various kinds of sensors. FIG. 3A shows an example of the vibration information detected by the vibration sensor 29. A horizontal axis represents time, and a vertical axis represents signal intensity (amplitude). FIG. 3A shows a state in which signals of various frequencies are synthesized. Frequency analysis is performed by performing envelope processing or filtering processing as necessary for the vibration information as shown in FIG. 3A, thereby extracting vibration in a desired frequency band and deriving a vibration value.

FIG. 3B shows an example of detection information indicating the rotational speed of the rolling bearing 101 detected by the rotational speed sensor 28. A horizontal axis represents time, and a vertical axis represents signal intensity. The rotational speed of the rotary shaft 105 (or the inner ring 104) is specified in accordance with a detection result of a pulse signal. The rotational speed may also vary during one rotation of the rotary shaft 105.

Figure 4A:
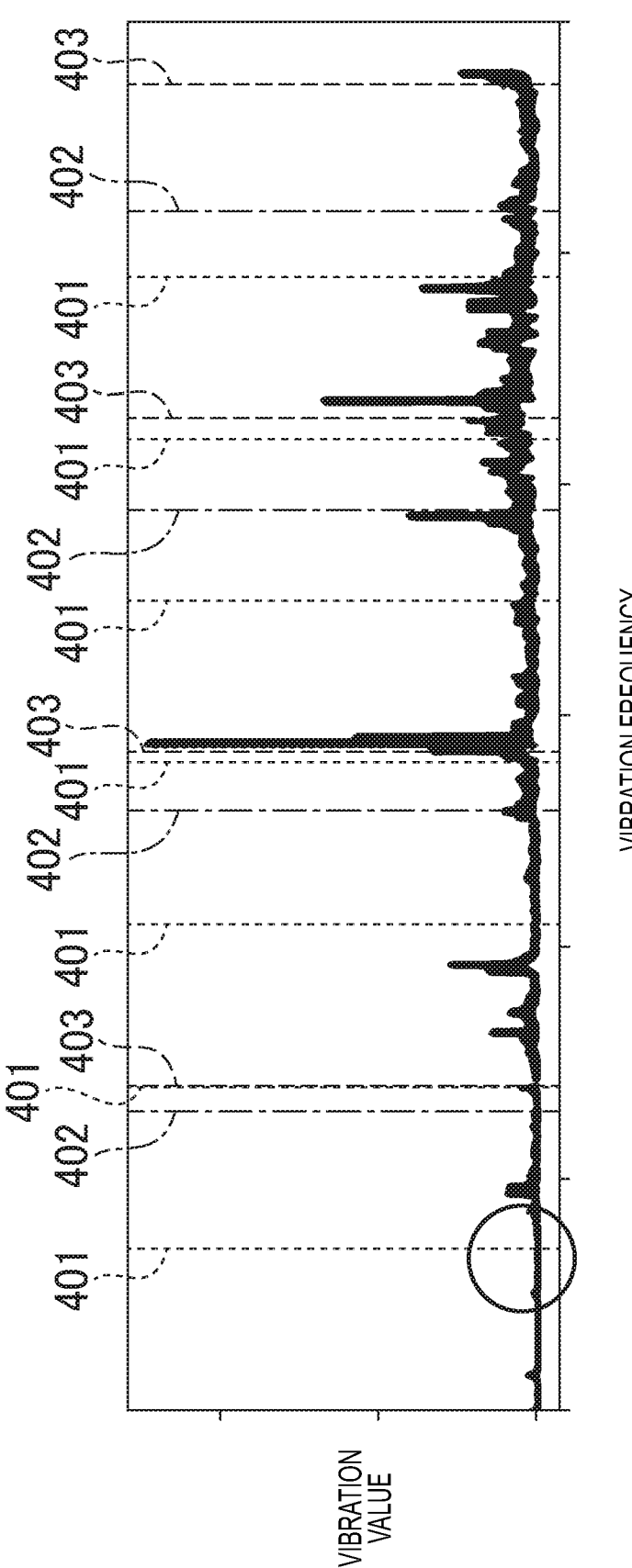
FIG. 4A is a conceptual diagram for explaining a load estimating method according to the first embodiment.
Figure 4B:
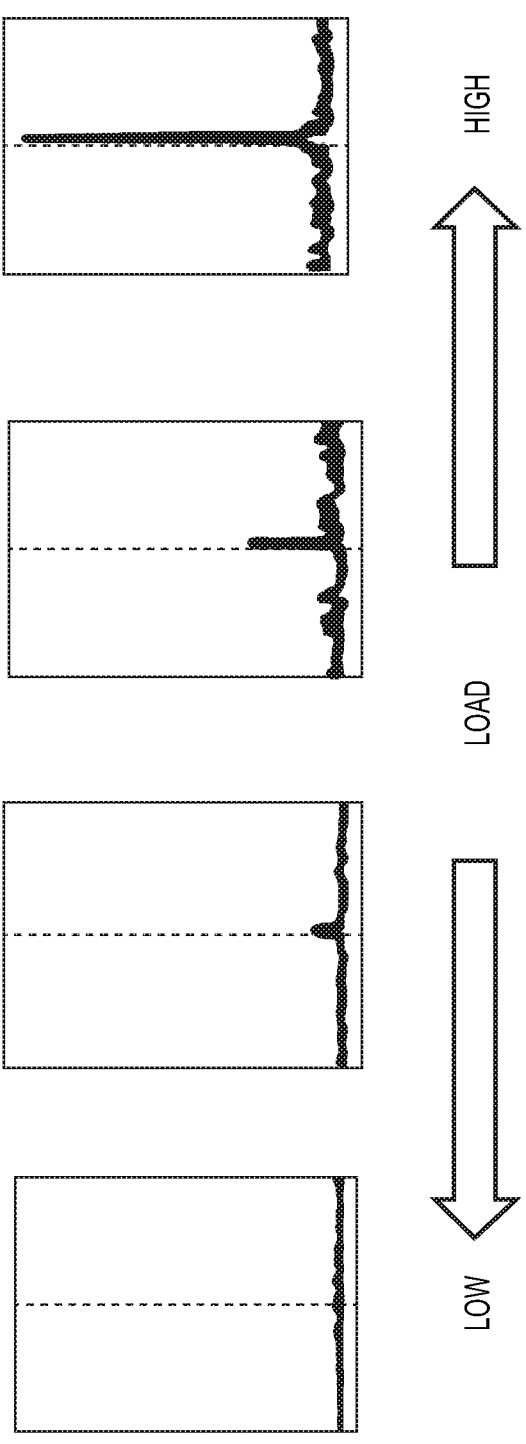
FIG. 4B is a conceptual diagram for explaining the load estimating method according to the first embodiment.

FIGS. 4A and 4B are conceptual diagrams at the time of estimating a load applied to a rolling bearing of a mechanical device. FIG. 4A shows data obtained by analyzing vibration information of the mechanical device and deriving a relationship between the vibration frequency and the vibration value. The mechanical device here is described as being incorporated with three rolling bearings (bearing A, bearing B, and bearing C), but the basic concept is the same even when the number of rolling bearings increases or decreases. Each rolling bearing has a theoretical frequency determined from the bearing specification, and in FIG. 4A, the theoretical frequency and high-order frequencies of each rolling bearing are shown. Lines 401 indicate a theoretical frequency and high-order frequencies of a bearing A. Lines 402 indicate a theoretical frequency and high-order frequencies of a bearing B. Lines 403 indicate a theoretical frequency and high-order frequencies of a bearing C. For example, in a case of examining a bearing load of the bearing A, a frequency, of the theoretical frequency and the high-order vibration frequencies of the bearing A, at which an S/N ratio with respect to the vibration (noise) other than the bearing is high and does not interfere with a natural frequency of the other bearing is used at one point or a plurality of points. A calculation formula of the theoretical frequency of the rolling bearing used in the present embodiment is shown below.

$$Zfc: Z \times fc$$

$$Zfi: Z \times fi$$

-continued $$2\,fb\!:2\times fb$$

$$fi\!:fr-fc$$

Z (number of rolling elements), fc (revolution frequency of rolling elements [Hz]), fr (rotational frequency of inner ring [Hz]), and fb (rotation frequency of rolling elements [Hz]).

In FIG. 4B, attention is paid to one of the theoretical frequencies of the rolling bearing 101 in FIG. 4A. Here, a portion indicated by a circle in FIG. 4A (corresponding to the theoretical frequency of the bearing A) will be described as an example. In the load estimating method according to the present embodiment, attention is paid to the intensity of the vibration value with respect to the theoretical frequency and the high-order (N-th order) vibration frequency of the rolling bearing 101. In the present embodiment, the higher the vibration value of the theoretical vibration frequency is, the higher the load on the rolling bearing 101 is derived. In the present embodiment, the load is derived using a predetermined table.

In the present embodiment, for example, the rolling bearing 101 is rotated in a state in which the bearing load can be estimated (constant speed and constant torque) or in a state in which the bearing load can be measured by a strain gauge or the like using a device that simulates a necessary portion of a mechanical device in which the rolling bearing 101 is actually used. A correspondence relationship among the load, the rotational speed, and the vibration (vibration value) of the generated vibration frequency is specified by performing measurement while changing the load and the rotational frequency of the rolling bearing 101. The correspondence relationship is defined in advance in a table format. FIG. 9 shows an example of a table showing the correspondence relationship between the vibration value of the predetermined vibration frequency and the load at each rotational speed. In the table, the vibration value and the rotational speed may be defined in association with each other in portions of certain numerical ranges. The table may further be defined in association with the wind direction, the wind volume, the wind pressure, the pitch angle of the blades 15, the output of the power generator 24, the operation state of the brake device (not shown), and the like. Further, the table may be defined in association with a deterioration state of the lubricant used in the rolling bearing 101 and an operation history (total rotational frequency, operation time, and the like) of the rolling bearing 101. The pre-defined table is stored in the information storage portion 205.

In a case in which the load is estimated using the high-order (N-th order) vibration frequency in addition to the theoretical frequency, different tables may be used for the theoretical frequency and the high-order vibration frequency. Whether to estimate the load using the vibration value corresponding to the theoretical frequency or the high-order vibration frequency may be determined in accordance with the rotational speed. Since it is assumed that the noise increases at the theoretical frequency and the high-order vibration frequency depending on the rotational speed, the load estimation may be performed with the vibration frequency with less noise as a target. In this case, the vibration frequency of interest is defined in advance in accordance with the rotational speed. Alternatively, an average of the vibration values of the theoretical frequency and the high-order vibration frequency may be used. Accordingly, even in a case in which a noise is included at some vibration frequencies, it is possible to reduce the influence of the noise.

[Processing Flow]

Figure 5:
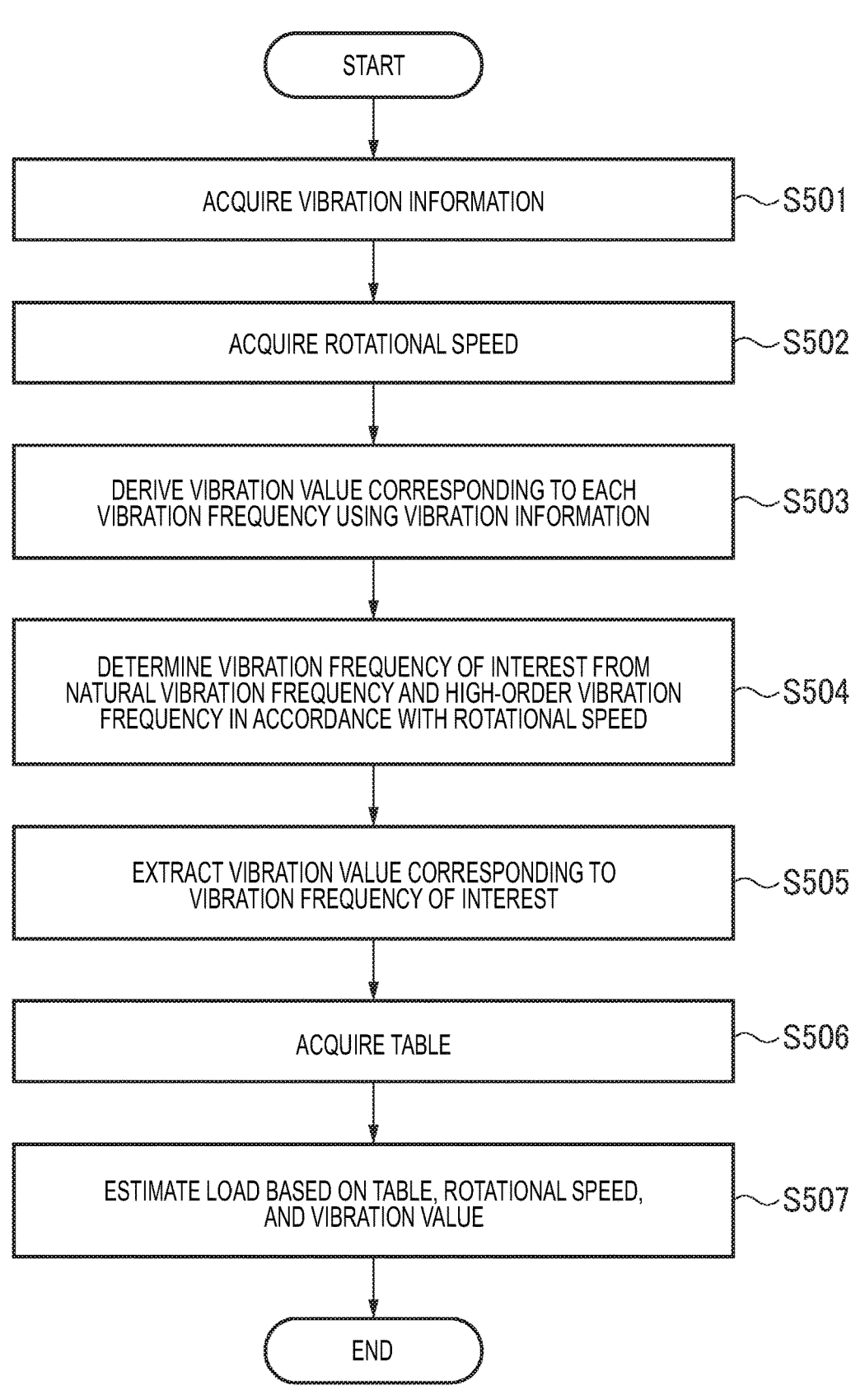
FIG. 5 is a flowchart of load derivation processing according to the first embodiment.

FIG. 5 is a flowchart of the load estimation processing according to the present embodiment. The processing is executed by the load estimating device 200, and may be implemented by, for example, the control device (not shown) included in the load estimating device 200 reading a program for implementing each part shown in FIG. 1 from a storage device and executing the program.

In S501, the load estimating device 200 acquires the vibration information of the rolling bearing 101 detected by the vibration sensor 27 and stored in the information storage portion 205. In a case in which the load estimation is performed in real time, the signal detected by the vibration sensor 29 may be directly acquired.

In S502, the load estimating device 200 acquires the rotational speed of the rolling bearing 101 detected by the rotational speed sensor 28 and stored in the information storage portion 205. In a case in which the load estimation is performed in real time, the signal detected by the rotational speed sensor 28 may be directly acquired. As described above, the detection timings of the vibration information acquired in S501 and the rotational speed acquired in S502 correspond with each other.

In S503, the load estimating device 200 performs vibration analysis processing based on the vibration information acquired in S501. Here, processing of deriving a vibration value corresponding to each vibration frequency using the vibration information is performed. At this time, the vibration analysis processing may be performed after envelope processing or LPF or BPF filter processing is performed.

In S504, the load estimating device 200 determines the vibration frequency of interest from the theoretical frequency and the high-order vibration frequency of the rolling bearing 101 in accordance with the rotational speed acquired in S502. The correspondence relationship between the vibration frequency of interest and the rotational speed is defined in advance, and determination is performed based on the correspondence relationship. At this time, attention may be paid to one or more vibration frequencies.

In S505, the load estimating device 200 extracts the vibration value of the vibration frequency determined in S504 from a vibration analysis result in S503.

In S506, the load estimating device 200 acquires a table from the information storage portion 205. As described above, a table in which the load, the rotational speed, and the vibration value of the predetermined vibration frequency are associated with one another is defined and stored in the information storage portion 205.

In S507, the load estimating device 200 estimates the load on the rolling bearing 101 based on the rotational speed acquired in S502, the vibration value extracted in S505, and the table acquired in S506. When it is determined in S504 that attention is paid to a plurality of vibration frequencies, for example, the load may be derived based on the vibration value of each vibration frequency, and the largest load among the loads may be treated as the estimation result. Alternatively, an average value of the loads derived based on the vibration values of the vibration frequencies may be treated as the estimation result. Then, the processing flow ends.

As described above, it is possible to estimate a load on a rolling bearing, which can cope with an instantaneous change in the load during a rotation operation according to the present embodiment. Further, a mechanical device does not require large-scale processing for estimating a load, and the load can be estimated at low cost.

Second Embodiment

A second embodiment of the present invention will be described. The description of the same configurations as those of the first embodiment will be omitted, and the description will be made focusing on the difference. In the second embodiment, a load estimating method using a learned model generated by performing learning processing using learning data including vibration information, a rotational speed, and a load will be described.

It is assumed that similarly to the first embodiment, there is a correlation among the vibration value, the rotational speed, and the load in the rolling bearing, and the learning processing is performed using the information.

[Functional Configuration]

Figure 6:
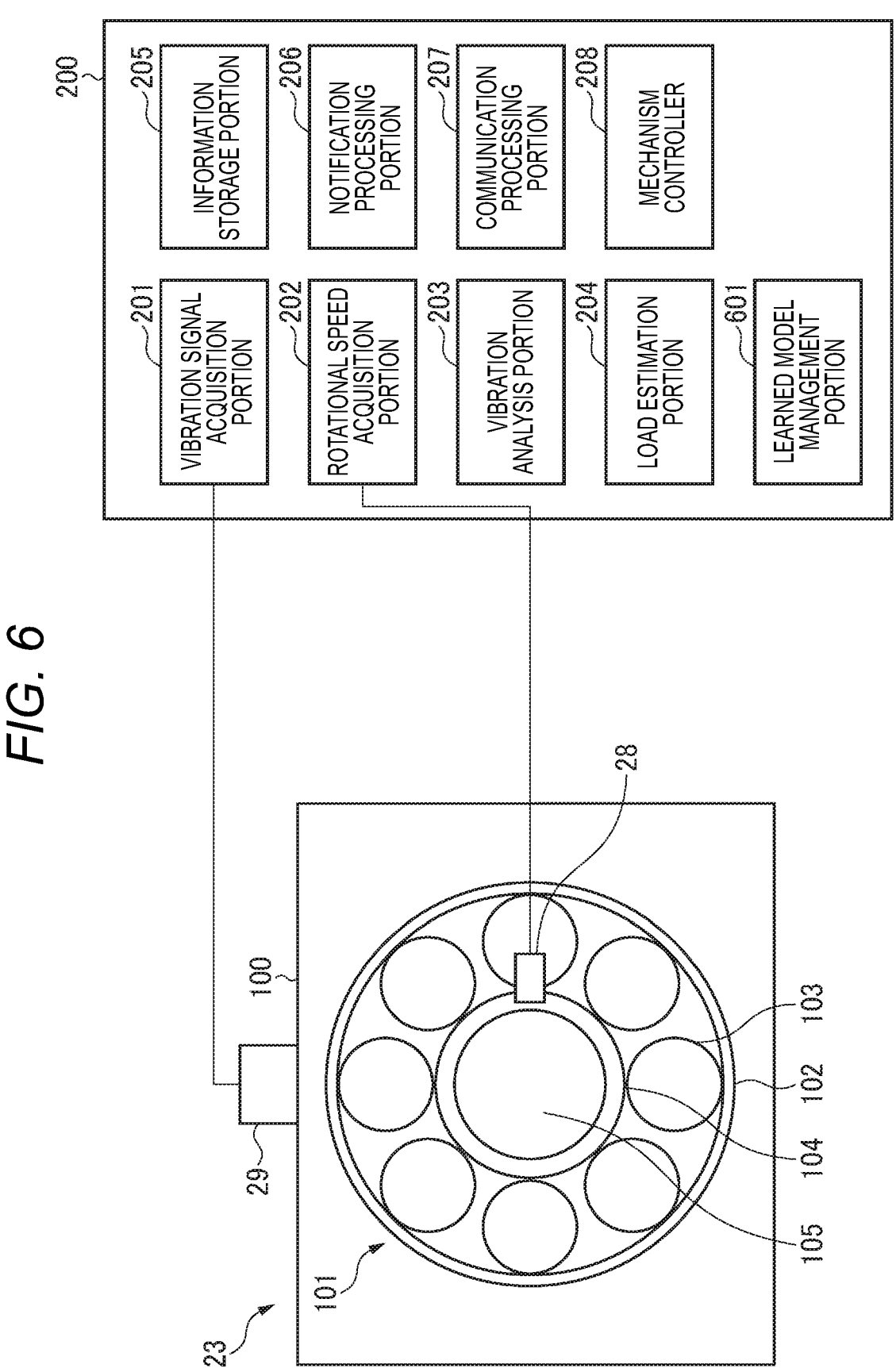
FIG. 6 is a conceptual diagram for explaining a functional configuration and measurement according to a second embodiment.

FIG. 6 is a conceptual diagram for explaining a functional configuration and measurement according to the present embodiment. The load estimating device 200 includes a learned model management portion 601 as a difference from the functional configuration described in the first embodiment with reference to FIG. 2. The learned model management portion 601 may be implemented by the above-described control device reading a corresponding program from a storage device and executing the program.

The learned model management portion 601 manages a learned model generated by learning processing performed in advance. In the present embodiment, the learned model is described as being generated by the learning processing performed in advance, but the learning processing may be executed again at a predetermined timing (for example, a timing at which a certain amount of data is collected), and the learned model managed by the learned model management portion 601 may be updated with the learned model generated as a result. In addition, the learning processing may be executed by the load estimating device 200 or may be executed by an external learning server (not shown) connected via a network (not shown).

In the present embodiment, the load estimation portion 204 acquires the learned model managed by the learned model management portion 601, and treats an analysis result analyzed by the vibration analysis portion 203 as input data to the learned model. As a result, the load estimation portion 204 estimates the output data output from the learned model as the load to the rolling bearing 101.

[Learning Processing]

In the present embodiment, a learned model for outputting a load is generated using a theoretical frequency, a vibration value, and a rotational speed of the rolling bearing 101 as input data. A learning method according to the present embodiment will be described using supervised learning based on a neural network, but other methods (algorithm or the like) may be used.

FIG. 7 is a diagram for explaining a concept of the learning processing according to the present embodiment. The learning data used in the present embodiment includes a pair of input data and teacher data. The input data includes, for example, a vibration frequency (theoretical frequency and high-order vibration frequency thereof), a vibration value, and a rotational speed of rolling bearing 101.

In a case in which the input data is input to a learning model, a value indicating the load is output as output data. Then, the output data and the teacher data (here, the value of the load) are compared using a loss function, and a weight in the learning model is adjusted in accordance with the difference, thereby updating parameters of the learning model. By repeating the processing, a learned model is generated. That is, in the present embodiment, a learned model for estimating a load by regression is generated. As described above, the learning processing may be repeated every time a certain amount of learning data is added, and the learned model may be updated based on the learning result.

Items of the input data in the learning data described above is an example, and other types of information may be added. For example, wind information (for example, wind direction, wind volume, wind pressure, and the like) acquired by a wind sensor (not shown) which is included in the wind turbine generator 10 may be included. Further, control information of the wind turbine generator 10 may be included. The control device here may include, for example, pitch and yaw control values by the blade 15 and the rotation mechanism 14, and a control value of a brake mechanism (not shown).

[Processing Flow]

Figure 8:
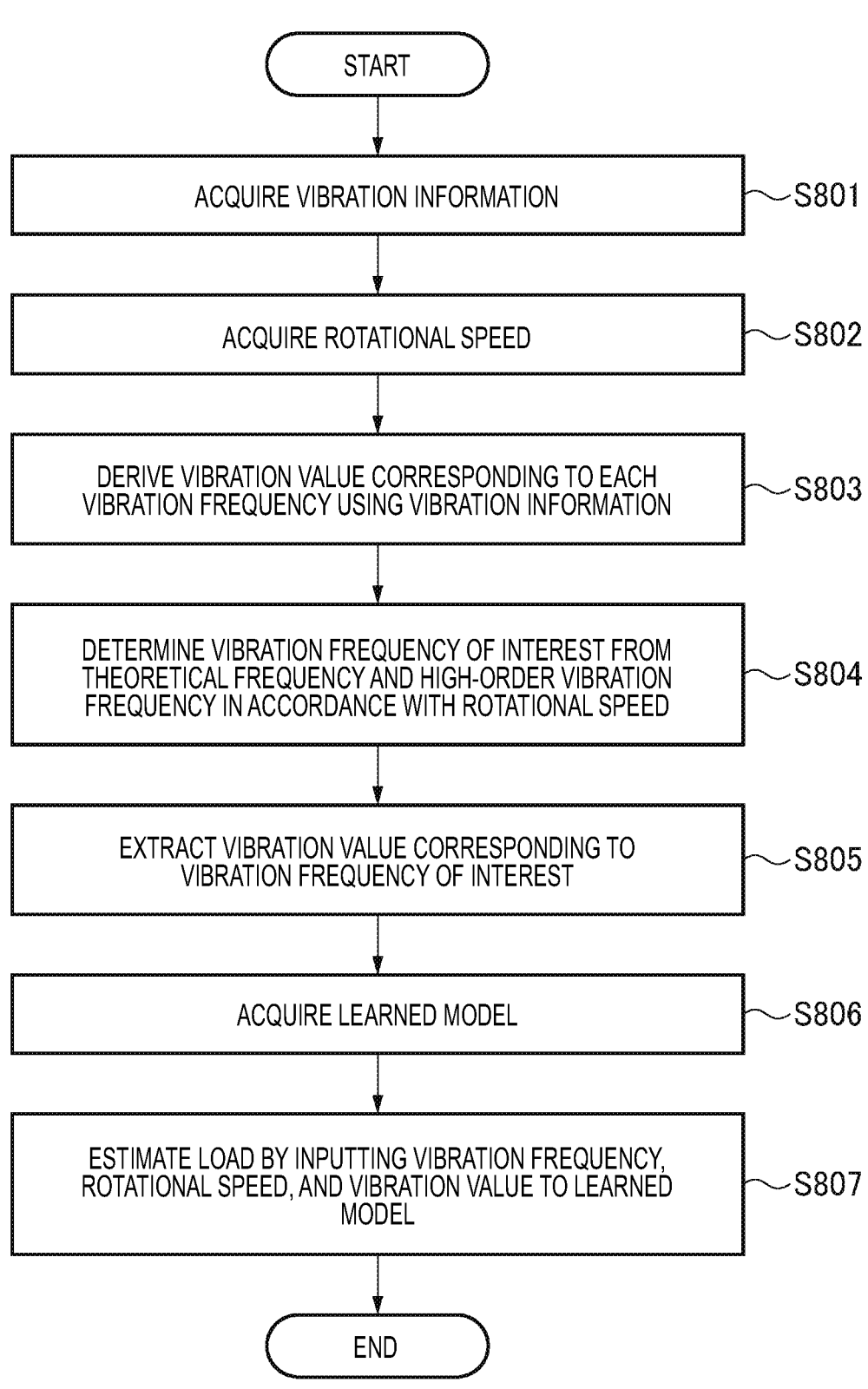
FIG. 8 is a flowchart of load derivation processing according to the second embodiment.

FIG. 8 is a flowchart of the load estimation processing according to the present embodiment. The processing is executed by the load estimating device 200, and may be implemented by, for example, the control device (not shown) included in the load estimating device 200 reading a program for implementing each part shown in FIG. 1 from a storage device and executing the program.

In S801, the load estimating device 200 acquires the vibration information of the rolling bearing 101 detected by the vibration sensor 29 and stored in the information storage portion 205. In a case in which the load estimation is performed in real time, the signal detected by the vibration sensor 29 may be directly acquired.

In S802, the load estimating device 200 acquires the rotational speed of the rolling bearing 101 detected by the rotational speed sensor 28 and stored in the information storage portion 205. In a case in which the load estimation is performed in real time, the signal detected by the rotational speed sensor 28 may be directly acquired. As described above, the detection timings of the vibration information acquired in S801 and the rotational speed acquired in S802 correspond with each other.

In S803, the load estimating device 200 performs vibration analysis processing based on the vibration information acquired in S801. Here, processing of deriving a vibration value corresponding to each vibration frequency using the vibration information is performed. At this time, the vibration analysis processing may be performed after envelope processing or filter processing using LPF or BPF is performed.

In S804, the load estimating device 200 determines the vibration frequency of interest from the theoretical frequency and the high-order vibration frequency of the rolling bearing 101 in accordance with the rotational speed acquired in S802. The correspondence relationship between the vibration frequency of interest and the rotational speed is defined in advance, and determination is performed based on the correspondence relationship.

In S805, the load estimating device 200 extracts the vibration value of the vibration frequency determined in S804 from a vibration analysis result in S803.

In S806, the load estimating device 200 acquires a learned model. As described above, the learned model is managed by the learned model management portion 601, and the latest learned model is acquired.

In S807, the load estimating device 200 uses the rotational speed acquired in S802, the vibration frequency determined in S804, and the vibration value extracted in S805 as input data, applies the input data to the learned model acquired in S806, and estimates the load obtained as the output data as the load on the rolling bearing 101. Then, the processing flow ends.

As described above, it is possible to estimate a load on a rolling bearing, which can cope with an instantaneous change in the load during a rotation operation according to the present embodiment. Further, a mechanical device does not require large-scale processing for estimating a load, and the load can be estimated at low cost.

Third Embodiment

A third embodiment of the present invention will be described. The description of the same configurations as those of the first embodiment will be omitted, and the description will be made focusing on the difference. In the third embodiment, an aspect in which a load on the wind turbine generator 10 is estimated and the wind turbine generator 10 is controlled based on an estimation result will be described. The device, the functional configuration, the signal configuration, and the like are the same as those described in the first embodiment with reference to FIGS. 1 to 4B.

[Processing Flow]

Figure 10:
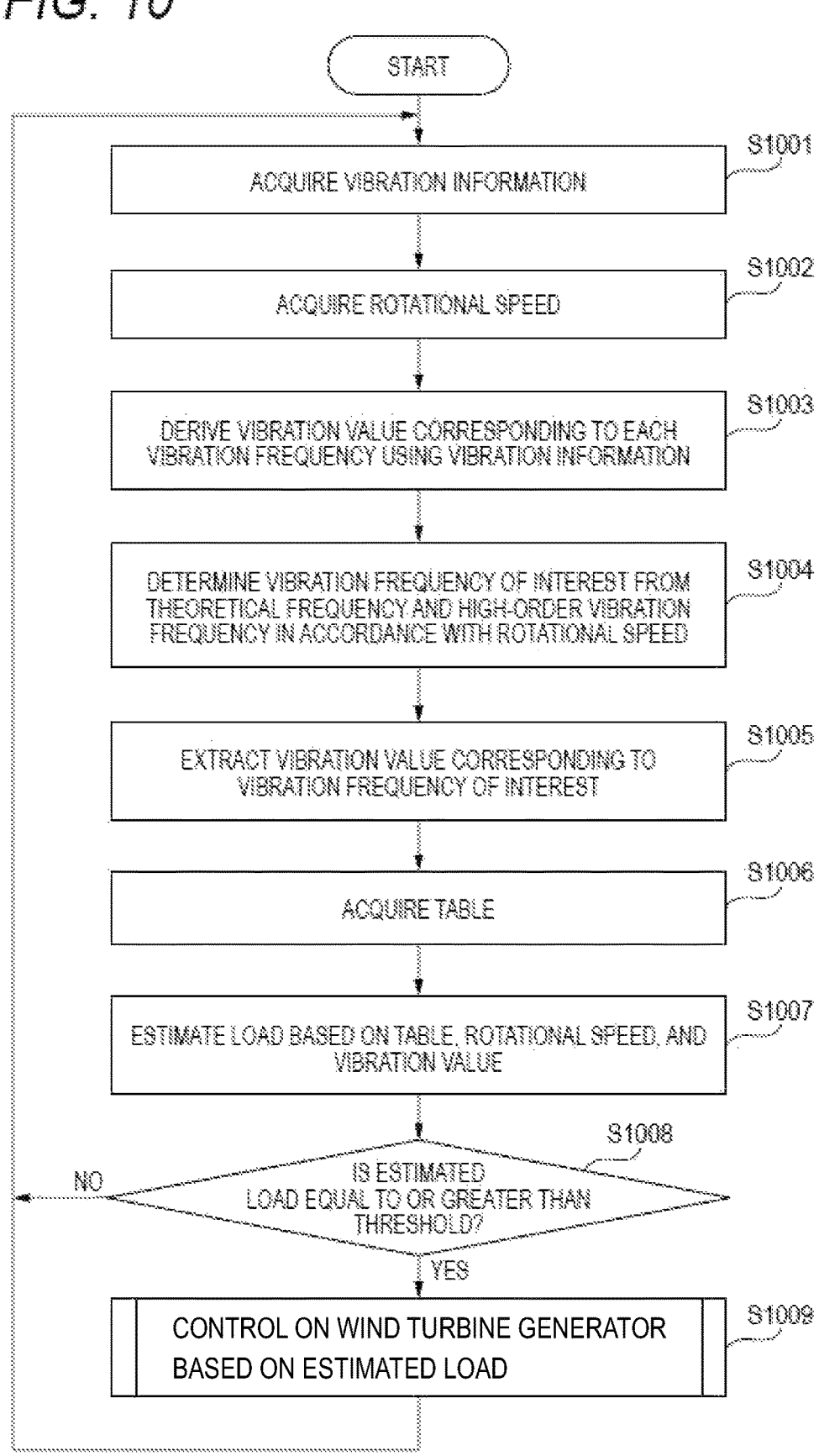
FIG. 10 is a flowchart of overall processing of a wind turbine generator according to a third embodiment.

FIG. 10 is a flowchart of control processing of the wind turbine generator 10 based on load estimation according to the present embodiment. The processing is executed by the load estimating device 200, and may be implemented by, for example, the control device (not shown) included in the load estimating device 200 reading a program for implementing each part shown in FIG. 1 from a storage device and executing the program.

In S1001, the load estimating device 200 acquires the vibration information of the rolling bearing 101 detected by the vibration sensor 27 and stored in the information storage portion 205. In a case in which the load estimation is performed in real time, the signal detected by the vibration sensor 29 may be directly acquired.

In S1002, the load estimating device 200 acquires the rotational speed of the rolling bearing 101 detected by the rotational speed sensor 28 and stored in the information storage portion 205. In a case in which the load estimation is performed in real time, the signal detected by the rotational speed sensor 28 may be directly acquired. As described above, the detection timings of the vibration information acquired in S1001 and the rotational speed acquired in S1002 correspond with each other.

In S1003, the load estimating device 200 performs vibration analysis processing based on the vibration information acquired in S1001. Here, processing of deriving a vibration value corresponding to each vibration frequency using the vibration information is performed. At this time, the vibration analysis processing may be performed after envelope processing or filter processing using LPF or BPF is performed.

In S1004, the load estimating device 200 determines the vibration frequency of interest from the theoretical frequency and the high-order vibration frequency of the rolling bearing 101 in accordance with the rotational speed acquired in S1002. The correspondence relationship between the vibration frequency of interest and the rotational speed is defined in advance, and determination is performed based on the correspondence relationship. At this time, attention may be paid to one or more vibration frequencies.

In S1005, the load estimating device 200 extracts the vibration value of the vibration frequency determined in S1004 from a vibration analysis result in S1003.

In S1006, the load estimating device 200 acquires a table from the information storage portion 205. As described above, a table in which the load, the rotational speed, and the vibration value of the predetermined vibration frequency are associated with one another is defined and stored in the information storage portion 205.

In S1007, the load estimating device 200 estimates the load on the rolling bearing 101 based on the rotational speed acquired in S1002, the vibration value extracted in S1005, and the table acquired in S1006. When it is determined in S1004 that attention is paid to a plurality of vibration frequencies, for example, the load may be derived based on the vibration value of each vibration frequency, and the largest load among the loads may be treated as the estimation result. Alternatively, an average value of the loads derived based on the vibration values of the vibration frequencies may be treated as the estimation result.

In S1008, the load estimating device 200 determines whether the load estimated in S1007 is equal to or greater than a threshold. The threshold here is defined in advance and stored in the information storage portion 205. The threshold may be a constant value or may vary based on an operation history of the wind turbine generator 10. For example, the threshold may vary in accordance with the total rotational frequency of the rolling bearing 101. In addition, the load estimated in the past may be stored, and the threshold may vary in accordance with an accumulation of the load. More specifically, the threshold may be set to be low in a case in which the total rotational frequency or the load accumulated in the past exceeds a certain value. Accordingly, it is possible to execute the control for reducing the load (load on the wind turbine generator 10) (processing of S1009 in the subsequent stage) at an early stage. In a case in which the load is equal to or greater than the threshold (YES in S1008), the processing of the load estimating device 200 proceeds to S1009, and in a case in which the load is less than the threshold (NO in S1008), the processing of the load estimating device 200 returns to S1001 and continues the processing.

In S1009, the load estimating device 200 controls the wind turbine generator 10 based on the load estimated in S1007. Details of this step will be described later with reference to FIG. 11. Then, this processing flow ends.

(Control on Wind Turbine Generator Based on Estimated Load)

Figure 11:
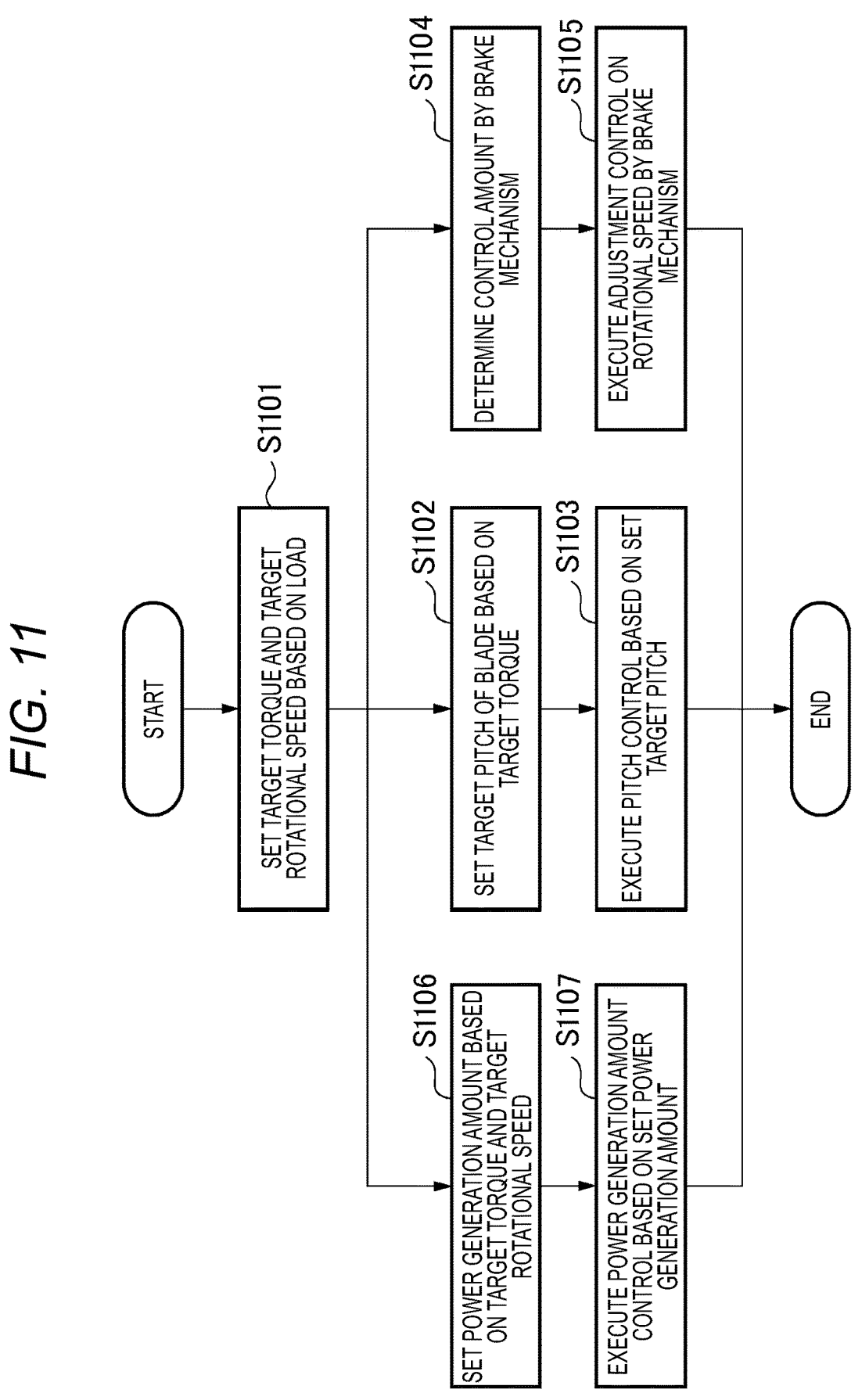
FIG. 11 is a flowchart of control processing based on a load of the wind turbine generator according to the third embodiment.

FIG. 11 is a flowchart of control processing corresponding to S1009 in FIG. 10.

In S1101, the load estimating device 200 sets target torque and a target rotational frequency generated in the rotor 13 based on the estimated bearing load. The target torque and the target rotational frequency may be defined based on, for example, a difference between the threshold used in S1008 and the estimated bearing load. At this time, a table in which the difference is associated with the target torque and the target rotational frequency may be held, and the target torque and the target rotational frequency may be determined based on the table. At this time, the target torque and the target rotational frequency are set to values such that the load on the rolling bearing 101 falls within an appropriate range. By setting within this range, generation of an excessively large or excessively small load is suppressed. After the processing of S1101, a pitch control (S1102 and S1103), a rotational speed control (S1104 and S1105) by a brake mechanism, and a power generation amount control (S1106 and S1107) are performed.

In S1102, the load estimating device 200 sets a target pitch (pitch angle) of the blade 15 based on the set target torque and target rotational frequency. The target pitch may be defined based on, for example, a difference between the threshold used in S1008 and the estimated load. At this time, a table in which the difference is associated with the target pitch may be held, and the target pitch may be determined based on the table. At this time, the target pitch is set to a value at which the load on the rolling bearing 101 falls within an appropriate range.

In S1103, the load estimating device 200 executes the pitch control on the blade 15 based on the target pitch set in S1102. At this time, a control amount of rotation around a rotor shaft (not shown) corresponding to each of the plurality of blades 15 may be determined in consideration of the time required to reach the target pitch.

In S1104, the load estimating device 200 determines a control amount for adjusting the rotational speed by the brake mechanism (not shown) based on the detected rotational speed (rotational speed acquired in S1002) and the target rotational frequency set in S1101. At this time, the control amount may be determined in consideration of the time required to reach the target rotational speed.

In S1105, the load estimating device 200 executes adjustment control on the rotational speed by the brake mechanism (not shown) using the control amount determined in S1104.

In S1106, the load estimating device 200 sets the power generation amount by the power generator 24 based on the set target torque and target rotational frequency. The power generation amount set here may be defined based on, for example, the difference between the threshold used in S1008 and the estimated load. At this time, a table in which the difference and the power generation amount are associated with each other may be held, and the power generation amount may be set based on the table.

In S1107, the load estimating device 200 executes power generation amount control by the power generator 24 based on the power generation amount set in S1107. After the pitch control (S1102 and S1103), the rotational speed control (S1104 and S1105) by the brake mechanism, and the power generation amount control (S1106 and S1107) are executed, the processing flow ends.

By repeating the processing in FIGS. 10 and 11, it is possible to perform control suitable for the environment while increasing or decreasing the load on the rolling bearing 101.

In the example in FIG. 11, the flow in which the pitch control (S1102 and S1103), the rotational speed control (S1104 and S1105) by the brake mechanism, and the power generation amount control (S1106 and S1107) are controlled in parallel has been described, but the flow is not limited to the simultaneous parallel flow. For example, a part of each control may be performed in series. Alternatively, any one of the three control may not be performed in accordance with the difference between the load and the threshold.

The set values of the target pitch, the target torque, and the target rotational frequency in the control processing in FIG. 11 may be set in consideration of the past control history. For example, the set values used in the control processing shown in FIG. 11 performed immediately before and the elapsed time from the immediately previous control processing may be stored in the storage device, and the set values may be derived using the history information.

In the control processing in FIG. 11, the torque control by changing the pitch of the blade 15 and controlling the power generation amount and the control by the brake mechanism for controlling the rotational speed are shown, but the present invention is not limited thereto, and other control may be combined.

As described above, according to the present embodiment, it is possible to perform load estimation in response to an instantaneous change in a rotational speed of a rolling bearing included in a mechanical device, and perform control using an estimation result, thereby elongating the service life of the mechanical device and suppressing a failure. Further, a mechanical device does not require large-scale processing for estimating a load, and the load can be estimated at low cost.

OTHER EMBODIMENTS

The various kinds of data described in the above embodiments are examples, and other data may be used. For example, in addition to the vibration and the rotational frequency as the measurement data and the learning data, a bearing pre-pressure, an internal gap, a load zone, a temperature (bearing temperature, oil temperature, and shaft/housing temperature), torque, a power generation amount, an oil type, and the like may be added. The frequency analysis may be performed in a normal manner (with a fixed sampling time), or an order ratio analysis may be performed.

In the present invention, a program or an application for implementing functions of the one or more embodiments described above may be supplied to a system or a device using a network or a storage medium, and processing in which one or more processors in the system or the device may read and execute the program may be implemented.

In addition, it may be implemented by a circuit (for example, an application specific integrated circuit (ASIC) or a field programmable gate array (FPGA)) that implements one or more functions.

As described above, the present invention is not limited to the above-described embodiments, and combinations of the respective configurations of the embodiments and changes and modifications made by those skilled in the art based on the descriptions in the description and the well-known technique are intended by the present invention and are thus also included within the scope of the present invention to be protected.

As described above, the following matters are disclosed in the present description.

(1) A load estimating device for a rolling bearing, including:

a vibration sensor configured to measure vibration of the rolling bearing during rotation;

a rotational speed sensor configured to measure a rotational speed of the rolling bearing during rotation;

a derivation portion configured to derive a vibration value of a predetermined vibration frequency using vibration information measured by the vibration sensor; and an estimation portion configured to estimate a load applied to the rolling bearing, the load corresponding to the rotational speed measured by the rotational speed sensor and the vibration value derived by the derivation portion, using a table in which a correspondence relationship among the load applied to the rolling bearing, the vibration value of the predetermined vibration frequency, and the rotational speed is defined.

According to this configuration, it is possible to estimate the load on the rolling bearing that can cope with an instantaneous change in the load during a rotation operation.

(2) The load estimating device according to (1), in which the table is defined such that the load applied to the rolling bearing increases as the vibration value of the predetermined vibration frequency increases.

According to this configuration, the load can be estimated based on the tendency that the load increases as the vibration value increases.

(3) A load estimating device for a rolling bearing, including:

a vibration sensor configured to measure vibration of the rolling bearing during rotation;

a rotational speed sensor configured to measure a rotational speed of the rolling bearing during rotation;

a derivation portion configured to derive a vibration value of a predetermined vibration frequency using vibration information measured by the vibration sensor; and an estimation portion configured to estimate a load applied to the rolling bearing, the load corresponding to the vibration value of the predetermined vibration frequency derived by the derivation portion and the rotational speed measured by the rotational speed sensor, using a learned model obtained by performing learning processing using data including a pair of the load applied to the rolling bearing as well as the vibration value of the predetermined vibration frequency and the rotational speed of the rolling bearing as learning data and using the load applied to the rolling bearing as output data.

According to this configuration, it is possible to estimate the load on the rolling bearing that can cope with an instantaneous change in the load during a rotation operation.

(4) The load estimating device according to any one of (1) to (3), in which as the predetermined vibration frequency, one or more of a theoretical frequency of the rolling bearing and a high-order vibration frequency thereof are used.

According to this configuration, the load can be estimated in accordance with the configuration of the rolling bearing.

(5) The load estimating device according to any one of (1) to (4), further including:

a determination portion configured to determine a vibration frequency of interest from a theoretical frequency of the rolling bearing and a high-order vibration frequency thereof based on the rotational speed measured by the rotational speed sensor, in which the derivation portion is configured to derive a vibration value of the vibration frequency determined by the determination portion.

According to this configuration, the vibration frequency of interest can be changed in accordance with the rotational speed of the rolling bearing, and the load may be accurately estimated based on the vibration value of the vibration frequency of interest.

(6) The load estimating device according to (4) or (5), in which the theoretical frequency is based on Zfc, Zfi, or 2fb.

According to this configuration, the load can be estimated based on the theoretical frequency corresponding to the configuration of the rolling bearing.

(7) The load estimating device according to any one of (1) to (6), in which the vibration value of the predetermined vibration frequency is an acceleration, a speed, or a displacement.

According to this configuration, the load can be estimated based on the acceleration, the speed, or the displacement as the vibration value.

(8) The load estimating device according to any one of (1) to (7), in which the rolling bearing is a rolling bearing configured to support a main shaft of a wind turbine generator.

According to this configuration, the load applied to the rolling bearing can be estimated even in a wind turbine generator in which a rotational speed of a main shaft may vary instantaneously due to an influence of wind or the like.

(9) A control device for a mechanical device including a rolling bearing, the control device including:

the load estimating device according to (1) to (8); and a controller configured to control at least one of torque around a shaft supported by the rolling bearing and rotation of the rolling bearing in accordance with the load estimated by the estimation portion.

According to this configuration, the load estimation may be performed in response to an instantaneous change in the rotational speed of the rolling bearing included in the mechanical device, and the control may be performed using an estimation result, thereby elongating the service life of the mechanical device and suppressing a failure.

(10) The control device according to (9), in which the control device is configured to control a rotational frequency or a rotational speed of the rolling bearing.

According to this configuration, the rotational frequency or the rotational speed of the rolling bearing can be controlled, thereby reducing a load on the rolling bearing and implementing elongation of the service life of the mechanical device and suppression of a failure.

(11) The control device according to (9) or (10), in which the mechanical device is a wind turbine generator, the controller is further configured to perform at least one of pitch control, power generation amount control, and brake control of a blade included in the wind turbine generator in accord with the load estimated by the estimation portion, and the controller is configured to in the pitch control, based on a difference between a threshold and the estimated load, reduce a pitch angle when the difference is positive and increase the pitch angle when the difference is negative, and in the brake control, based on a difference between a threshold and the estimated load, operate a brake mechanism to reduce a rotational speed of a rotary shaft when the difference is positive, and is configured not to operate the brake mechanism when the difference is negative.

According to this configuration, the pitch control or the brake control can be performed in accordance with the load in the wind turbine generator, thereby reducing the load on the rolling bearing and implementing elongation of the service life of the mechanical device and suppression of a failure.

(12) The control device according to any one of (9) to (11), further including:

a storage portion configured to store information on a control history by the controller, in which the controller is configured to set the torque around the shaft supported by the rolling bearing and a control amount of the rotation of the rolling bearing based on the control history.

According to this configuration, it is possible to perform more appropriate control by setting the next control amount in accordance with the control history.

(13) A load estimating method for a rolling bearing, including:

a first measurement step of measuring vibration of the rolling bearing during rotation;

a second measurement step of measuring a rotational speed of the rolling bearing during rotation;

a derivation step of deriving a vibration value of a predetermined vibration frequency using vibration information measured in the first measurement step; and an estimation step of estimating a load applied to the rolling bearing, the load corresponding to the rotational speed measured in the second measurement step and the vibration value derived in the derivation step, using a table in which a correspondence relationship among the load applied to the rolling bearing, the vibration value of the predetermined vibration frequency, and the rotational speed is defined.

According to this configuration, it is possible to estimate the load on the rolling bearing that can cope with an instantaneous change in the load during a rotation operation.

(14) A load estimating method for a rolling bearing, including:

a first measurement step of measuring vibration of the rolling bearing during rotation;

a second measurement step of measuring a rotational speed of the rolling bearing during rotation;

a derivation step of deriving a vibration value of a predetermined vibration frequency using vibration information measured in the first measurement step; and an estimation step of estimating a load applied to the rolling bearing, the load corresponding to the vibration value of the predetermined vibration frequency derived in the derivation step and the rotational speed measured in the second measurement step, using a learned model obtained by performing learning processing using data including a pair of the load applied to the rolling bearing as well as the vibration value of the predetermined vibration frequency and the rotational speed of the rolling bearing as learning data and the load applied to the rolling bearing as output data.

According to this configuration, it is possible to estimate the load on the rolling bearing that can cope with an instantaneous change in the load during a rotation operation.

(15) A non-transitory computer-readable storage medium storing a computer program configured to cause a computer to function as:

a first acquisition portion configured to acquire vibration information of a rolling bearing during rotation;

a second acquisition portion configured to acquire a rotational speed of the rolling bearing during rotation;

a derivation portion configured to derive a vibration value of a predetermined vibration frequency using the vibration information; and an estimation portion configured to estimate a load applied to the rolling bearing, the load corresponding to the rotational speed acquired by the second acquisition portion and the vibration value derived by the derivation portion, using a table in which a correspondence relationship among the load applied to the rolling bearing, the vibration value of the predetermined vibration frequency, and the rotational speed is defined.

According to this configuration, it is possible to estimate the load on the rolling bearing that can cope with an instantaneous change in the load during a rotation operation.

(16) A non-transitory computer-readable storage medium storing a computer program configured to cause a computer to function as:

a first acquisition portion configured to acquire vibration information of a rolling bearing during rotation;

a second acquisition portion configured to acquire information on a rotational speed of the rolling bearing during rotation;

a derivation portion configured to derive a vibration value of a predetermined vibration frequency using the vibration information; and an estimation portion configured to estimate a load applied to the rolling bearing, the load corresponding to the vibration value of the predetermined vibration frequency derived by the derivation portion and the rotational speed acquired by the second acquisition portion, using a learned model obtained by performing learning processing using data including a pair of the load applied to the rolling bearing as well as the vibration value of the predetermined vibration frequency and the rotational speed of the rolling bearing as learning data and using the load applied to the rolling bearing as output data.

According to this configuration, it is possible to estimate the load on the rolling bearing that can cope with an instantaneous change in the load during a rotation operation.

Although various embodiments have been described above with reference to the drawings, the present invention is not limited to these examples. It is apparent to those skilled in the art that various changes or modifications can be conceived within the scope described in the claims, and it is understood that the changes or modifications naturally fall within the technical scope of the present invention. In addition, the components described in the above embodiments may be combined in any manner without departing from the spirit of the invention.

REFERENCE SIGNS LIST 10 wind turbine generator
11 tower
12 nacelle
13 rotor
14 rotation mechanism
15 blade
16 hub
21 drive train portion
22 main shaft
23 speed increaser
24 power generator
25 bearing unit
26 rotational speed sensor
27 vibration sensor
28 rotational speed sensor
29 vibration sensor
30 rotational speed sensor
31 power generation amount measurement device
100 housing
101 rolling bearing
102 outer ring
103 rolling element
104 inner ring
105 rotary shaft
200 load estimating device
201 vibration signal acquisition portion
202 rotational speed acquisition portion
203 vibration analysis portion

204 load estimation portion
205 information storage portion
206 notification processing portion
207 communication processing portion
208 mechanism controller
601 learned model management portion

The invention claimed is:

1. A load estimating device for a rolling bearing, comprising:
   a vibration sensor configured to measure vibration of the rolling bearing during rotation;
   a rotational speed sensor configured to measure a rotational speed of the rolling bearing during rotation;
   a derivation portion configured to derive a vibration value of a predetermined vibration frequency using vibration information measured by the vibration sensor;
   an estimation portion configured to estimate a load applied to the rolling bearing, the load corresponding to the rotational speed measured by the rotational speed sensor and the vibration value derived by the derivation portion, using a table in which a correspondence relationship among the load applied to the rolling bearing, the vibration value of the predetermined vibration frequency, and the rotational speed is defined;
   a determination portion configured to determine a vibration frequency of interest from a theoretical frequency of the rolling bearing and a high-order vibration frequency thereof based on the rotational speed measured by the rotational speed sensor; and
   a controller configured to control at least one of torque around a shaft supported by the rolling bearing and rotation of the rolling bearing in accordance with the load estimated by the estimation portion, wherein
   the derivation portion is configured to derive a vibration value of the vibration frequency determined by the determination portion.

2. The load estimating device according to claim 1, wherein
   the table is defined such that the load applied to the rolling bearing increases as the vibration value of the predetermined vibration frequency increases.

3. The load estimating device according to claim 1, wherein
   as the predetermined vibration frequency, one or more of a theoretical frequency of the rolling bearing and a high-order vibration frequency thereof are used.

4. The load estimating device according to claim 3, wherein
   the theoretical frequency is based on Zfc, Zfi, or 2fb.

5. The load estimating device according to claim 1, wherein
   the vibration value of the predetermined vibration frequency is an acceleration, a speed, or a displacement.

6. The load estimating device according to claim 1, wherein
   the rolling bearing is a rolling bearing configured to support a main shaft of a wind turbine generator.

7. A control device for a mechanical device including a rolling bearing, the control device comprising:
   the load estimating device according to claim 1.

8. The control device according to claim 7, wherein
   the control device is configured to control a rotational frequency or a rotational speed of the rolling bearing.

9. The control device according to claim 7, wherein
   the mechanical device is a wind turbine generator,
   the controller is further configured to perform at least one of pitch control, power generation amount control, and brake control of a blade included in the wind turbine generator in accordance with the load estimated by the estimation portion, and
   the controller is configured to
     in the pitch control, based on a difference between a threshold and the estimated load, reduce a pitch angle when the difference is positive and increase the pitch angle when the difference is negative, and
     in the brake control, based on a difference between a threshold and the estimated load, operate a brake mechanism to reduce a rotational speed of a rotary shaft when the difference is positive, and is configured not to operate the brake mechanism when the difference is negative.

10. The control device according to claim 7, further comprising:
   a storage portion configured to store information on a control history by the controller, wherein
   the controller is configured to set the torque around the shaft supported by the rolling bearing and a control amount of the rotation of the rolling bearing based on the control history.

11. A load estimating device for a rolling bearing, comprising:
   a vibration sensor configured to measure vibration of the rolling bearing during rotation;
   a rotational speed sensor configured to measure a rotational speed of the rolling bearing during rotation;
   a derivation portion configured to derive a vibration value of a predetermined vibration frequency using vibration information measured by the vibration sensor;
   an estimation portion configured to estimate a load applied to the rolling bearing, the load corresponding to the vibration value of the predetermined vibration frequency derived by the derivation portion and the rotational speed measured by the rotational speed sensor, using a learned model obtained by performing learning processing using data including a pair of the load applied to the rolling bearing as well as the vibration value of the predetermined vibration frequency and the rotational speed of the rolling bearing as learning data and using the load applied to the rolling bearing as output data;
   a determination portion configured to determine a vibration frequency of interest from a theoretical frequency of the rolling bearing and a high-order vibration frequency thereof based on the rotational speed measured by the rotational speed sensor; and
   a control portion configured to control at least one of torque around a shaft supported by the rolling bearing and rotation of the rolling bearing in accordance with the load estimated by the estimation portion, wherein
   the derivation portion is configured to derive a vibration value of the vibration frequency determined by the determination portion.

12. A load estimating method for a rolling bearing, comprising:
   a first measurement step of measuring vibration of the rolling bearing during rotation;
   a second measurement step of measuring a rotational speed of the rolling bearing during rotation;
   a derivation step of deriving a vibration value of a predetermined vibration frequency using vibration information measured in the first measurement step;
   an estimation step of estimating a load applied to the rolling bearing, the load corresponding to the rotational speed measured in the second measurement step and the vibration value derived in the derivation step, using a table in which a correspondence relationship among the load applied to the rolling bearing, the vibration value of the predetermined vibration frequency, and the rotational speed is defined;

a determination step of determining a vibration frequency of interest from a theoretical frequency of the rolling bearing and a high-order vibration frequency thereof based on the rotational speed measured in the second measurement step; and a control step of controlling at least one of torque around a shaft supported by the rolling bearing and rotation of the rolling bearing in accordance with the load estimated by the estimation step, wherein in the derivation step, a vibration value of the vibration frequency determined in the determination step is derived.

13. A load estimating method for a rolling bearing, comprising:

a first measurement step of measuring vibration of the rolling bearing during rotation;

a second measurement step of measuring a rotational speed of the rolling bearing during rotation;

a derivation step of deriving a vibration value of a predetermined vibration frequency using vibration information measured in the first measurement step; and an estimation step of estimating a load applied to the rolling bearing, the load corresponding to the vibration value of the predetermined vibration frequency derived in the derivation step and the rotational speed measured in the second measurement step, using a learned model obtained by performing learning processing using data including a pair of the load applied to the rolling bearing as well as the vibration value of the predetermined vibration frequency and the rotational speed of the rolling bearing as learning data and using the load applied to the rolling bearing as output data;

a determination step of determining a vibration frequency of interest from a theoretical frequency of the rolling bearing and a high-order vibration frequency thereof based on the rotational speed measured in the second measurement step; and a control step of controlling at least one of torque around a shaft supported by the rolling bearing and rotation of the rolling bearing in accordance with the load estimated by the estimation step, wherein in the derivation step, a vibration value of the vibration frequency determined in the determination step is derived.

14. A non-transitory computer-readable storage medium storing a computer program configured to cause a computer to function as:

a first acquisition portion configured to acquire vibration information of a rolling bearing during rotation;

a second acquisition portion configured to acquire a rotational speed of the rolling bearing during rotation;

a derivation portion configured to derive a vibration value of a predetermined vibration frequency using the vibration information; and an estimation portion configured to estimate a load applied to the rolling bearing, the load corresponding to the rotational speed acquired by the second acquisition portion and the vibration value derived by the derivation portion, using a table in which a correspondence relationship among the load applied to the rolling bearing, the vibration value of the predetermined vibration frequency, and the rotational speed is defined;

a determination portion configured to determine a vibration frequency of interest from a theoretical frequency of the rolling bearing and a high-order vibration frequency thereof based on the rotational speed measured by the rotational speed sensor; and a control portion configured to control at least one of torque around a shaft supported by the rolling bearing and rotation of the rolling bearing in accordance with the load estimated by the estimation portion, wherein the derivation portion is configured to derive a vibration value of the vibration frequency determined by the determination portion.

15. A non-transitory computer-readable storage medium storing a computer program configured to cause a computer to function as:

a first acquisition portion configured to acquire vibration information of a rolling bearing during rotation;

a second acquisition portion configured to acquire information on a rotational speed of the rolling bearing during rotation;

a derivation portion configured to derive a vibration value of a predetermined vibration frequency using the vibration information; and an estimation portion configured to estimate a load applied to the rolling bearing, the load corresponding to the vibration value of the predetermined vibration frequency derived by the derivation portion and the rotational speed acquired by the second acquisition portion, using a learned model obtained by performing learning processing using data including a pair of the load applied to the rolling bearing as well as the vibration value of the predetermined vibration frequency and the rotational speed of the rolling bearing as learning data and using the load applied to the rolling bearing as output data;

a determination portion configured to determine a vibration frequency of interest from a theoretical frequency of the rolling bearing and a high-order vibration frequency thereof based on the rotational speed measured by the rotational speed sensor; and a control portion configured to control at least one of torque around a shaft supported by the rolling bearing and rotation of the rolling bearing in accordance with the load estimated by the estimation portion, wherein the derivation portion is configured to derive a vibration value of the vibration frequency determined by the determination portion.

* * * * *